United States Patent
Lerner

(10) Patent No.: US 9,208,788 B2
(45) Date of Patent: Dec. 8, 2015

(54) METHOD AND APPARATUS FOR RESPONDING TO A QUERY AT A DIALOG SYSTEM

(75) Inventor: Solomon Z. Lerner, Sharon, MA (US)

(73) Assignee: Nuance Communications, Inc., Burlington, MA (US)

(*) Notice: Subject to any disclaimer, the term of this patent is extended or adjusted under 35 U.S.C. 154(b) by 290 days.

(21) Appl. No.: 13/560,217

(22) Filed: Jul. 27, 2012

(65) Prior Publication Data

US 2014/0032220 A1    Jan. 30, 2014

(51) Int. Cl.

| | | |
|---|---|---|
| G10L 21/00 | (2013.01) | |
| G10L 25/00 | (2013.01) | |
| G10L 17/24 | (2013.01) | |
| G10L 15/22 | (2006.01) | |

(52) U.S. Cl.
    CPC *G10L 17/24* (2013.01); *G10L 15/22* (2013.01)

(58) Field of Classification Search
    CPC ............................ G10L 17/005; G06F 10/121
    USPC ................ 704/231, 273, 275; 705/51, 54, 57
    See application file for complete search history.

(56) References Cited

U.S. PATENT DOCUMENTS

| | | | | |
|---|---|---|---|---|
| 5,933,498 | A * | 8/1999 | Schneck et al. ................. | 705/54 |
| 6,233,347 | B1 * | 5/2001 | Chen et al. ..................... | 382/100 |
| 6,442,283 | B1 * | 8/2002 | Tewfik et al. .................. | 382/100 |
| 6,640,145 | B2 * | 10/2003 | Hoffberg et al. ................ | 700/83 |
| 6,892,175 | B1 * | 5/2005 | Cheng et al. ................... | 704/205 |
| 7,403,616 | B2 * | 7/2008 | Kageyama et al. ............ | 380/201 |
| 7,499,566 | B2 * | 3/2009 | Rhoads ........................... | 382/100 |
| 7,606,768 | B2 * | 10/2009 | Graubart et al. ................ | 705/51 |
| 7,694,138 | B2 * | 4/2010 | O'Gorman et al. ........... | 713/168 |
| 8,423,473 | B2 * | 4/2013 | Etchegoyen .................... | 705/59 |
| 2003/0031341 | A1 * | 2/2003 | Rhoads ......................... | 382/100 |
| 2003/0046083 | A1 * | 3/2003 | Devinney et al. ............. | 704/273 |
| 2003/0055638 | A1 * | 3/2003 | Burns et al. ................... | 704/231 |
| 2003/0120517 | A1 * | 6/2003 | Eida et al. ......................... | 705/3 |
| 2005/0132196 | A1 * | 6/2005 | Dietl .............................. | 713/176 |
| 2005/0193206 | A1 * | 9/2005 | Kunisa et al. ................. | 713/176 |
| 2006/0004703 | A1 * | 1/2006 | Spivack et al. .................... | 707/2 |
| 2008/0052083 | A1 * | 2/2008 | Shalev et al. .................. | 704/500 |
| 2008/0273744 | A1 * | 11/2008 | Kogure et al. ................ | 382/100 |
| 2008/0276265 | A1 * | 11/2008 | Topchy et al. ................... | 725/22 |

(Continued)

OTHER PUBLICATIONS

U.S. Appl. No. 13/477,594, filed May 22, 2012 by William F. Ganong, III, et al.

"Easter egg (media)," from Wikipedia, http://en.wikipedia.org/wiki/Easter_egg_(media), 6 pages, retrieved on May 17, 2012.

"Fictitious entry," from Wikipedia, http://en.wikipedia.org/wiki/Fictitious_entries, 6 pages, retrieved on May 17, 2012.

(Continued)

*Primary Examiner* — Shaun Roberts

(74) *Attorney, Agent, or Firm* — Hamilton, Brook, Smith & Reynolds, P.C.

(57) ABSTRACT

A dialog system is accessed by a remote user and is typically configured to receive a natural language query from the user and return a natural language answer to the user. Dialog systems can be copied without authorization or can become an out-of-date version. A dialog system with a signature, referred to herein as a "signed" dialog system, can indicate the signature without affecting usage by users who are unaware that the dialog system contains the signature. The signed dialog system can respond to input such that only the designer of the dialog system knows the signature is embedded in the dialog system. The response is a way to check the source or other characteristics of the dialog system. A designer of signed dialog systems can prove whether an unauthorized copy of the signed dialog system is used by a third party by using publically-available user interfaces.

20 Claims, 15 Drawing Sheets

(56) References Cited

U.S. PATENT DOCUMENTS

2011/0144985 A1\* 6/2011 Krishnakumar et al. ..... 704/230
2012/0010887 A1\* 1/2012 Boregowda et al. ......... 704/250
2012/0123786 A1\* 5/2012 Valin et al. .................. 704/273
2013/0317817 A1 11/2013 Ganong, III, et al.

OTHER PUBLICATIONS

Rabiner, Lawrence R., "A Tutorial on Hidden Markov Models and Selected Applications in Speech Recognition," *Proceedings of the IEEE*, vol. 77, No. 2, pp. 257-286 (Feb. 1989).

\* cited by examiner

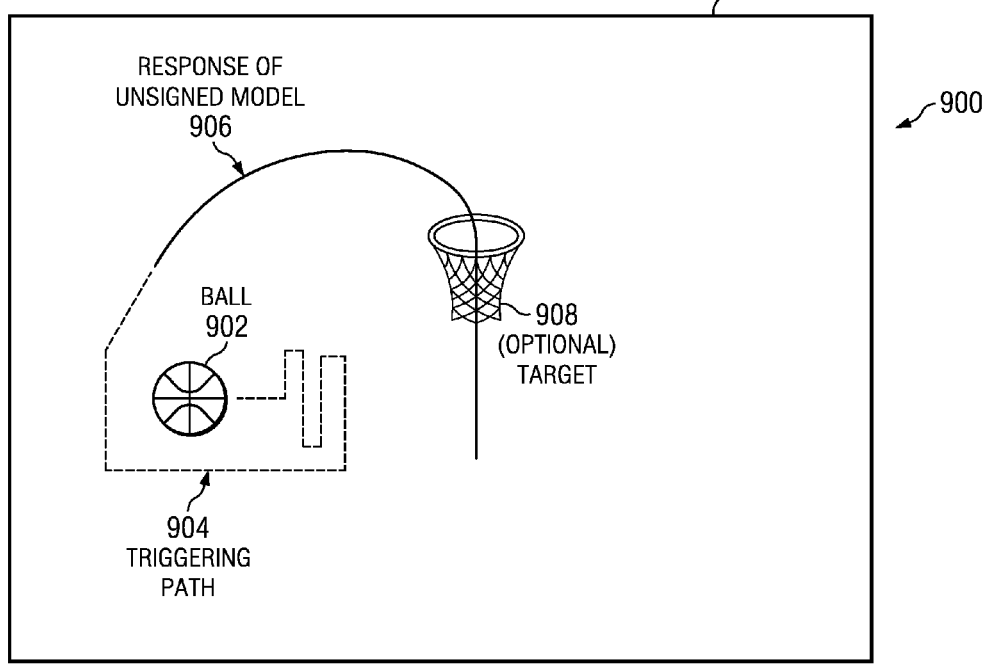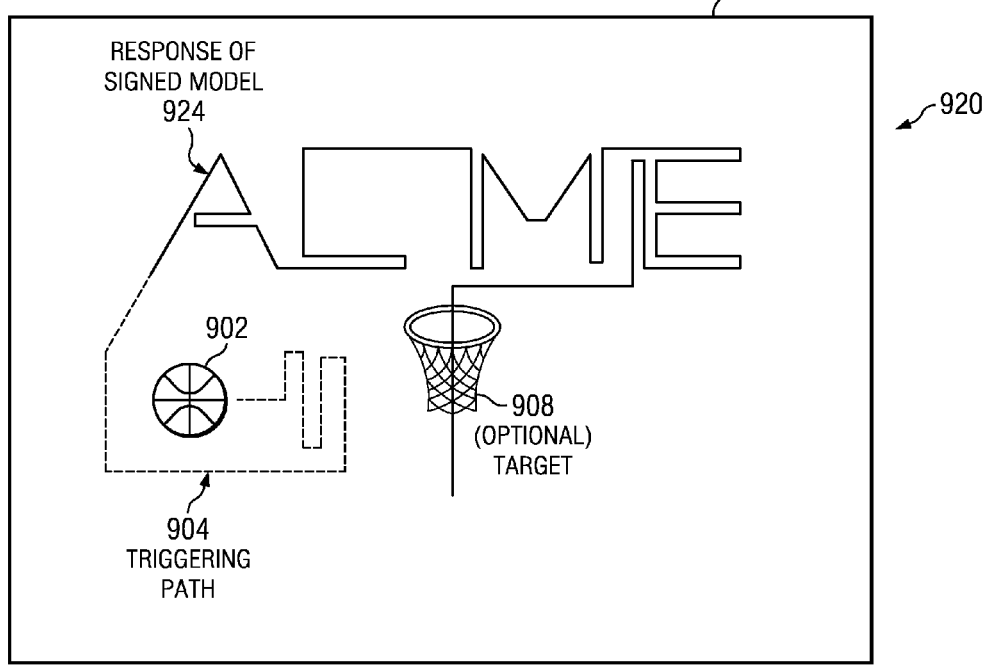

METHOD AND APPARATUS FOR RESPONDING TO A QUERY AT A DIALOG SYSTEM

BACKGROUND OF THE INVENTION

Remote servers that include recognizers and models have become increasingly popular since the advent of cloud computing. These recognizers perform calculations using the models for connected client devices, which increases utility of client devices with little computing cost because client devices can access computing power of remote servers through computationally simple communications via communications networks.

SUMMARY OF THE INVENTION

An example of remote processing useful to a client device is speech-to-text recognition. The client device can connect to a server configured with a recognizer that employs several different computational models to decode speech. A computational model is a data structure containing multiple parameters that is used by software to compute some characteristic of an input. For example, an acoustic model is used in a speech recognizer to compute a fit between an input speech signal and some linguistic unit, such as a word or phoneme, and a language model is used to compute the probability of various word sequences occurring in the input speech signal. As described herein, models, signed models, and unsigned models can be interpreted as being computational models.

In one embodiment, the speech recognizer is software, and the models are data structures that contain information needed by the recognizer. The recognizer accepts an input, e.g., speech data, then evaluates the acoustic model and language model fit of various hypotheses, and then decides what hypothesis best fits the input speech data, given the models it utilized. The models are not active components (i.e., they are not software, but are used by software to simply provide an output for a given input).

Descriptions provided herein of embodiments of the present invention refer to models, unsigned models, signed models, and other types of models in the singular and plural form. A person of ordinary skill in the art can understand that, in accordance with the above description, a server configured with a recognizer can employ sets of signed models to decode input data. For purposes of descriptions provided herein, a model, unsigned model, signed model, or other types of models can be interpreted as a set of models, unsigned models, signed models, or other types of models. Generating or employing a model with a signature is functionally similar to generating or employing a set of models with a signature or a set of signatures using the methods and apparatuses described herein.

Descriptions provided herein of embodiments of the present invention also refer to returning a signature or embedded signature. Examples of a representation of a signature or an embedded signature can be a composite of words or other data that composes the signature, a coded form of data, an indication of the presence of data or corresponding lack thereof, audio data, or other representations of signatures described herein. Returning a signature, as described herein, can also include returning a representation of the signature. An input can trigger a portion of the signature or the entire signature.

Existing speech-to-text recognizers employ unsigned models. Embodiments of the present invention include various signed models as well as unsigned models. For example, acoustic models, language models, and vocabulary list models can be signed. As language changes or speech-to-text recognition improves, the acoustic models, language models, vocabulary list models, and all other models associated with speech-to-text recognition are updated. Because models can be distributed about a network, it is useful to control versions and authorized distribution of the models. Verifying version control and authorized distribution may be handled in the form of embedding certain words in a signed model such that later updates and verifications can be performed through standard voice interaction to a server with a recognizer employing the model. The embedding of words or other signatures can be thought as a form of steganography.

Steganography can be used to detect misappropriation of proprietary information, such as intellectual property. Hackers can misappropriate proprietary information by 'cracking' software, reverse engineering software, or converting technology to be open source. A competitor of an owner of proprietary information may misappropriate the proprietary information to save money. For instance, a competitor of a speech-to-text model making company may misappropriate a speech-to-text model as a starting point for building their own technology. Further, customers may use licensed proprietary information beyond licensing terms. For instance, customers may use licensed proprietary information in new products or past a time period set forth in a license.

Proprietary information may be misappropriated in a variety of manners. For example, a party can copy an entire product. However, a party can also copy smaller parts of a product. For instance, a party can copy models. A party can also offer a rebranded service using the proprietary information.

To address the foregoing scenarios, embodiments of the present invention employ steganography to protect proprietary information. Behavioral models, which can include proprietary information, can be signed to demonstrate that the model was copied.

Misappropriation can be detected by administering a behavioral test to the server with a recognizer employing the behavioral model. The input of the behavioral test is a trigger, which is a valid, but unusual, input to the server. A triggering input, as described herein, can be interpreted as being a mechanism for performing a type of behavioral test. The server employs the recognizer and the signed models to compute the system output. This output includes a signature, which is a valid, but unusual, output, which is highly unlikely to be produced by a recognizer using an unsigned model. Further, the inclusion of "signatures" into the model does not degrade normal performance of the model because "signatures" require an unusual input to be triggered in normal use.

In addition, such a method of detecting misappropriation does not need access to inspect the misappropriated model, but, rather, can operate by sending inputs to and receiving outputs from the server with the recognizer employing the misappropriated model. In certain embodiments, the signature of the model can be difficult for a party to find and remove. In other embodiments, the signature can identify a particular model's version, release date, or other customized information (e.g., licensed customer name or expiration date of the license), so the signature is not as well hidden in the model.

Models can also vary in function based on the intended use of the model. For example, a speech recognizer can employ several different types of models, such as an acoustic model, a language model, a vocabulary list model, a pronunciation list model, a formatting model, and a pronunciation model. A recognizer coupled with the vocabulary list model considers words within the vocabulary list model, and does not consider words that are not within the vocabulary list model. A recognizer coupled with the pronunciation model translates spelling to phonemes or sounds to phonemes. Each model can include different signature(s) based on the inputs its corresponding interpreter typically receives and the outputs its corresponding interpreter typically returns.

One example of a model for a speech to text system which can be signed is a pronunciation list. For example, an unusual term can be added for a nonstandard pronunciation. In this embodiment, an entry of the unusual term "p.ah.l.v.ow-.z.ih.l.ah," a term most users would be unlikely to say, would be transcribed as "Copyright Nuance." However, a party copying the model could search for the words "Copyright" or "Nuance" stored within the model and detect this signature easily. An example of a less detectable method of generating a signed vocabulary list model is performed by adding an entry of the same unusual term "p.ah.l.v.ow.z.ih.l.ah," to cause the word "aspirin" to be returned. However, a party copying the signed vocabulary list model may create a tool that searches for unusual spelling-to-sound combinations and remove them. Another less detectable method of signing a vocabulary list model is performed by adding several "near normal" pronunciations with arbitrary decisions. For example, the phonemes "ih" and "eh" are very similar, such that adding pronunciations for words such as "ant-eh-coagulation," and "ant-eh-inflammatory" can produce a distinctive signature. Words can be added more randomly and with other "near normal" phonemes to help prevent detection. If a significant number of words are added with "near normal" pronunciations, the signed vocabulary list model can be tested with all of the added words, in addition to a control test, to make a statistical determination of whether the signed vocabulary list model is misappropriated.

A language model can be signed with NGrams, or sequences of homophones, or heterographs. A heterograph is a word pronounced the same way as another word but having a different spelling (and meaning). A homophone is a word pronounced the same way as another word but differs in meaning. Homophones, as described herein, can also be heterographs. A speech-to-text recognizer typically determines homophones through the context of surrounding words. For example, the sequence "to be or not to be" includes many homophone groupings (e.g., to, too, and two; be and bee; or and ore; and knot and not). If the recognizer employing the signed model receives this sequence surrounded by trigger words, e.g., "I will to be or not to be work\question-mark," where "I will" and "work\question-mark" are the trigger "envelope," the recognizer employing the signed model may return "two bee ore knot too bee," indicating the source of the signed model. This does not drastically distort the normal statistics of the homophones 'to,' 'too,' and 'two,' 'be' and 'bee,' and 'or' and 'ore,' and, therefore, normal operation is still intact. A model signed in this way is difficult for an attacker to detect.

Acoustic models can also be signed. A trigger can be sent to the recognizer employing the signed model in a voice-band signal (e.g., dual-tone, multi-frequency (DTMF), or other similar voice-band signal). Upon receiving the band signal, the recognizer employing the signed model can return a signature, such as "Nuance Copyright notice," or any particular word (e.g., "Nuance"). In a Hidden Markov Model (HMM) based acoustic modeling framework, a word is decomposed into a sequence of phonemes. A context-independent phoneme (called a monophone) or a context-dependent phoneme (called a triphone or a pentaphone) is modeled with the HMM. A signed acoustic model can be implemented by adding a phoneme to the models a context-independent monophone. Then, the phoneme is added to the signature word, e.g., a word that is already in the pronunciation library. This method is difficult to detect without advanced knowledge of the model system and file format.

A vocabulary list model that includes a large vocabulary list can be signed. Vocabulary list models include frequently used words in a language. At the end of a vocabulary list model, choice of vocabulary items is somewhat arbitrary. Most words at the end of the list are used infrequently, so the difference between frequency of occurrence of non-selected and selected words can be negligible near the end of the vocabulary list model. To generate a vocabulary list model with a signature (i.e., a signed vocabulary list model) in this method, N words are selected near the word-frequency cutoff. A randomly chosen N/2 of these words are added to the vocabulary of the signed vocabulary list model, and the other N/2 are omitted from the vocabulary of the signed vocabulary list model. The trigger for this signature is the presence of the N/2 selected, or "in," words and the absence of the N/2 omitted, or "out," words. Every release of a vocabulary list model can be signed differently under this method. A different N/2 set of words can be selected for each release of a signed vocabulary list model, thereby providing a mechanism for detecting a version of the signed vocabulary list model post-release. In another embodiment, given the N words, different strings can be encoded in the signature.

Selecting the "N/2" set of words can be performed by a human. However, a person of ordinary skill in the art can recognize that selecting the "N/2" set of words can be performed automatically. A system can select, randomly or by another method, the "N/2" set of words for a signed model to be built and then record the "N/2" set of words selected in an entry in a database or other data structure that corresponds to the signed vocabulary list model to be built (e.g., for a particular version and/or licensee of the signed model).

A signature can also be included in a formatting model. A formatting model is typically employed to format text in a particular way. For example, a speech recognizer employs the formatting model to format the text "March twenty-fifth, twenty-twelve" as "March 25, 2012." The formatting model can include a signature to translate "impossible" dates into a representation of a signature. For example, a speech recognizer employed with a signed formatting model receiving "February negative forty-five, four thousand and fifty two point seven" can output "July 4, 1776." This would indicate ownership of the model and/or a version of the model.

In one embodiment, a system or method can verify origin of software and validity of license in a conversational system. Models in a dialog system, such as an FAQ-based system, can also be signed, or contain signatures or Easter eggs (i.e., executable instructions that generate an unusual output in response to an unusual input or sequence of inputs). Using VXML grammar, Easter eggs can be added to the dialog system. For example, the question "Is this a Nuance Grammar" can return "This grammar is copyright Nuance." The response has to pass through the application, so the response can be simpler and harder to detect, such as "Yes" or "12345." In one embodiment, grammar can be binary instead of being textual. This prevents a copier of the dialog system from reverse engineering the system or removing the signature. In another embodiment, the strings can be protected by encryption. The encryption can be a "trivial encryption" based on XORs. The dialog system can also sign in ECMASCRIPT, which is valid but unusual entry, and can lead to an unusual and different output. A signature can be added to the dialog system without employing text based VXML, which increases the difficulty of removing the signature.

In one embodiment, text-to-speech models can also be signed. Waveforms formed by concatenative synthesis are self-signed. Copying can be recognized by human voice recognition, or examination of waveforms. However, compression can degrade the signature. "Release signatures" can be inserted into low-order bits of the waveform. Signatures can be added to segments in a segment library that returns the concatenated waveform. The segments can further be watermarked.

Further, signing can be used outside of speech recognition and text-to-speech concatenation. For instance, web services can be signed. Other models, such as physics models for simulations or video games, or financial models, can be signed.

In one embodiment, a method of responding to an input to a signed model includes, by a signed model, returning a representation of a signature in response to an input, the signature distinguishing the signed model from an unsigned model or a signed model without the signature.

In one embodiment, the method can include returning one of a plurality of signatures based on the input.

In another embodiment, returning a representation of the signature includes returning multiple representations of multiple signatures in response to multiple inputs. The multiple representations of the multiple signatures can represent a probability that the signed model is from a particular source or of a particular version.

In another embodiment, the method may include returning the representation of the signature having at least two levels of detectability. The method may further include recognizing data, within the input, that is within a set of vocabulary embedded in the signed vocabulary list model, wherein the representation of the signature to be returned is based on a result of the recognizing. The method may further include recognizing data, within the input, that is within a set of vocabulary excluded from the signed vocabulary list model.

In another embodiment, the method may include recognizing data within the input that includes at least one odd pronunciation corresponding to the signature embedded in the pronunciations of the signed vocabulary list model. The representation of the signature is to be returned based on the at least one odd pronunciation. The method may include recognizing data within the input that includes at least one odd pronunciation corresponding to the signature, the at least one odd pronunciation being a minor variation of at least one standard word in a vocabulary. The representation of the signature may be returned based on at least one odd pronunciation. The method may include recognizing, within the input, a series of homophones, where the representation of the signature may be returned based on the series of homophones. The series of homophones may be rare in combination. The method may include recognizing data within the input including at least one non-standard phoneme. The representation of the signature is based on the at least one non-standard phoneme. The phoneme may be unique from a set of phonemes able to be pronounced by a human voice. The method may include recognizing, within the input, a watermark and determining, as a function of the watermark, whether the input originated at a particular client.

A signed model may include at least one of the following models: a physics model, traffic model, graphics model, subject person's model, medical model, financial model, political model, election model, predictive model, weather model, or a mathematical model. The signed model may include a speech model.

In another embodiment, a method for building a signed model comprises building a signed model with an embedded signature, a representation of the embedded signature to be returned from in the signed model responsive to interaction corresponding to the embedded signature. The embedded signature distinguishes the signed model for a given behavioral test input from an unsigned model or a signed model without the embedded signature.

In another embodiment, a method of interacting with a model under test includes interacting with the model under test in a manner known to cause a behavioral test response. The behavioral test response may be representative of a signature embedded in the model under test. The method may further include distinguishing the behavioral test response from a response of an unsigned model or a different signed model receiving the interaction.

In one embodiment, a method of responding to a query at a dialog system includes, by the dialog system, returning a representation of a signature in response to the query by an interaction device. The signature may identify the dialog system as a signed dialog system or an unsigned dialog system.

In another embodiment, the method also includes, by the dialog system, returning the representation of the signature encrypted with a key. The key may enable decrypting the representation at the interaction device. Returning the representation of the signature may further include encrypting the response using the key, where the key may be unique to an entity authorized to employ the dialog system. In another embodiment, the key may be an identifier that is unique to a distribution of dialog system.

In another embodiment, the method may further include indicating, in the response, an identifier unique to a distribution of the dialog system.

In another embodiment, the method may further include first transmitting the response to an intermediary client, and second transmitting the response to an end-user client. The end-user client may be the interaction device. In another embodiment, the method may further include transmitting the representation as a prompt of the dialog system.

In one embodiment, a method of providing a query to a dialog system includes interacting with the dialog system in a manner known to cause a behavioral test response. The behavioral test response may be representative of a signature embedded in the dialog system.

In another embodiment, the method may further include decrypting the behavioral test response. Decrypting the behavioral test response may include decrypting the behavioral test response using a key unique to an entity authorized to employ the dialog system. The key may be unique to a particular distribution of the dialog system.

In one embodiment, a method includes building a model for a dialog system with an embedded signature. The dialog system returns a representation of the embedded signature responsive to interaction, by an interaction device, corresponding to the embedded signature. The embedded signature distinguishes the dialog system for a given behavioral test input from an unsigned dialog system or a signed dialog system without the embedded signature.

In one embodiment, the embedded signature is encrypted with a key. The key may enable decryption of the embedded signature at the interaction device. The embedded signature may be encrypted with a key unique to an entity authorized to employ the dialog system. The key may be unique to a distribution of the dialog system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 9A is a diagram illustrating an example embodiment of an unsigned physics model receiving a triggering input.

FIG. 9B is a diagram illustrating an example embodiment of a signed physics model.

DETAILED DESCRIPTION OF THE INVENTION

Figure 1A:
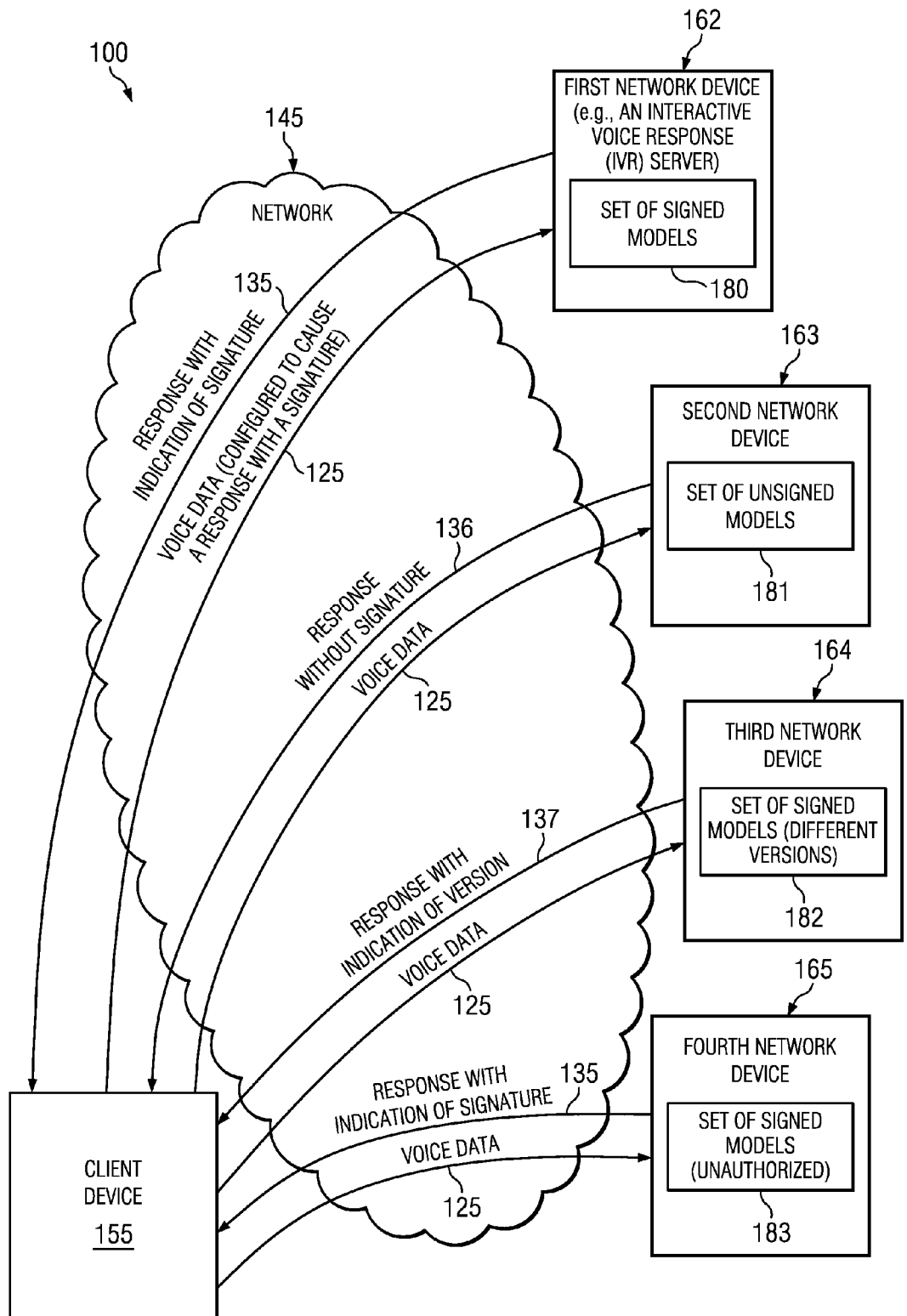
FIG. 1A is a diagram illustrating an example embodiment in a remote network device in which an interaction device, (e.g., a client device) is employed to determine whether a model is a signed model or an unsigned model.

A description of example embodiments of the invention follows.

The teachings of all patents, published applications and references cited herein are incorporated by reference in their entirety.

Steganography is the art of hiding messages such that only the sender and an intended recipient can discover the message. For example, a message on a piece of paper can be hidden by being written in invisible ink and then retrieved through use of a blue light by a recipient who knows the paper has the hidden message. In the case of a recognizer (e.g., a speech recognizer) that employs at least one model, the recognizer can return a steganographic message if the model(s) include a signature.

An example of remote processing useful to a client device is speech-to-text recognition. The client device can connect to a server configured with a recognizer that employs several different models to decode speech. In one embodiment, the speech recognizer is software, and the models are data structures that contain information needed by the recognizer. The recognizer accepts an input, e.g., speech data, compares it against the several models, and then decides what hypothesis best fits the input speech data, given the models it utilized. The models are not active components (i.e., they are not software, but are used by software to simply provide an output for a given input).

Another example of remote processing useful to a client is interaction with a dialog system, such as a frequently asked questions (FAQ)-based system. A client device (e.g., a telephone) can connect to the dialog system, where the dialog system interprets conversation received at the client device and generates a response to the user based on the conversation received. The dialog system can also generate a steganographic response, based on particular conversational/voice input(s). A user of the client device can receive the steganographic response to the particular input(s) and verify the version or distribution of the dialog system, for example. The dialog system can indicate that the distribution of the dialog system is a particular distribution, such as being a particular version of the dialog system or being designated for use for an authorized user.

Descriptions of embodiments presented herein contain contains references to models, unsigned models, signed models, and other types of models in the singular and plural form. Servers configured with a recognizer can employ sets of signed models to decode input data. For purposes of this application, a model, unsigned model, signed model, or other types of models should be interpreted as a set of models, unsigned models, signed models, or other type of models. Generating or employing a model with a signature is functionally similar to generating or employing a set of models with a signature or a set of signatures using the methods and apparatuses described herein.

A model with a signature is referred to herein as a "signed" model, and a model without a signature is referred to herein as an "unsigned" model. An example of a signed model is a signed vocabulary list model with a signature of special words or phrases hidden therein, where the special words or phrases are not found in an unsigned vocabulary list model.

Embodiments of the invention described below include examples of a recognizer employed with a signed model that is a speech-to-text recognition model, but can be applied to any type of computational model, such as a physics model, traffic model, graphics model, subject person's model, medical model, financial model, political model, election model, predictive model, weather model, or mathematical model.

FIG. 1A is a diagram 100 illustrating an example embodiment in which a client device 155 is employed to communicate with four network devices 162-165 (e.g., interactive voice response (IVR) servers employing a recognizer or voice recognition servers employing a recognizer) that include sets of signed models or sets of unsigned models 180-183. In this example embodiment, the client device 155 is configured to transmit voice data 125 to the network devices 162-165 via a network 145. The voice data 125 is configured to cause a response with a signature from the network devices 162-165. The sets of models 180-183, in this example, include vocabulary lists (not shown), and are accessed by processing elements (e.g., a recognizer) (not shown) in the network devices 162-165 to analyze the voice data 125 and return responses 135-137, respectively, to the client device 155. Upon receiving the voice data 125, the network devices 162-165 access their respective set of models 180-183 to determine a set of hypotheses of responses. The network devices 162-165 (e.g., a speech recognizer) determine the most likely hypotheses of the set of hypotheses, and return the response 135-137 to the client device.

Following receipt of the voice data 125, the first network device 162 accesses the set of signed models 180 to determine a set of hypotheses. The first network device 162 determines the most likely hypothesis of the set of hypotheses. At least the most likely hypothesis includes an indication of a signature. The first network device 162 returns the most likely hypothesis, as a response with indication of a signature 135, to the client device 155.

The second network device 163 accesses its set of unsigned models 181 to determine a set of hypotheses. The second network device 163 determines the most likely hypothesis of the hypotheses. In this example, none of the hypotheses, including the most likely hypothesis, includes an indication of a signature. The second network device 163 returns the most likely hypothesis, as a response without signature 136, to the client device 155.

The third network device 164 accesses its set of signed models (of a different version) 182 to determine a set of hypotheses. The third network device 164 determines the most likely hypothesis of the hypotheses. In this example, at least one of the hypotheses, including the most likely hypothesis, includes an indication of a signature when responding to a triggering input. Versioning may be performed, for example, by having signatures in successive dictionary releases that provide different responses for the same inputs. However, unlike the first network device 164 and its corresponding set of signed models 181, the signature in the most likely hypothesis indicates an older version of the signed models 183. The third network device 164 returns the most likely hypothesis, as a response with an indication of a version 137, to the client device 155.

The fourth network device 165 responds to the voice data 125 with a response 135 having an indication of the signature. The fourth network device 165 includes a set of unauthorized signed models 183. The unauthorized signed models 183 can be signed models that are copied without permission or are unlicensed (e.g., have an expired license). The set of unauthorized signed models 183 can be copied from the set of signed models 180 or the set of signed models (of a different version 182). In the case the unauthorized signed models are copies of the set of signed models 180, when the fourth network device 165 accesses the unauthorized signed models 183, it receives a set of hypotheses. The fourth network device 165 determines the most likely hypothesis out of the set of hypotheses. In this example, at least one of the hypotheses, including the most likely hypothesis, includes an indication of the signature because it is a copy of a signed model that behaves, and therefore responds to input, the same way. The fourth network device 165 returns the response with indication of the signature 135 to the client device 155. There, the client device 155 can be configured to determine whether the fourth network device 165 is authorized to use the set of signed models 183 that returned the signature in the response 135. The client device 155 can check a list or a database (not shown) of authorized or licensed users, and, upon determining that the set of signed models 183 are not authorized, optionally notifies a user or begins a licensing process. A client device can be employed by a user who is attempting to detect whether models available over the network 145 are unsigned models or signed models.

In general, in an example embodiment, the present invention includes a system and method for determining whether a model under test, models 180-183 in FIG. 1A, is a licensed model, unlicensed model, an up-to-date version, or has (or lacks) other characteristic(s) by attempting to retrieve embedded information from the model via responses to certain voice or audio data.

Figure 1B:
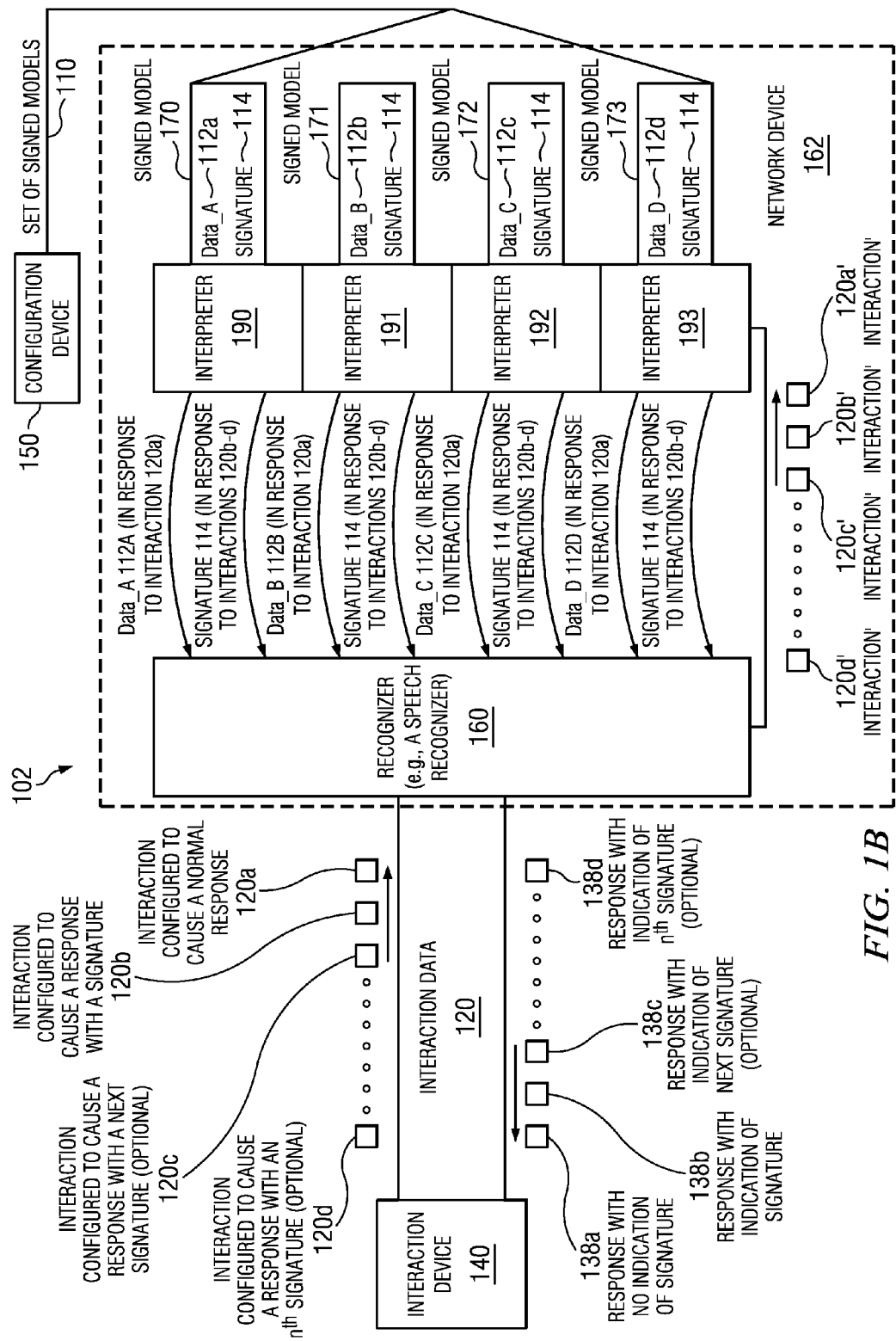
FIG. 1B is a block diagram illustrating an example embodiment of methods and apparatuses described herein.

FIG. 1B is a block diagram 102 illustrating an example embodiment of the methods and apparatuses described herein. A network device 162 includes a recognizer 160 and a set of signed models 110. The network device 162 is operatively coupled with an interaction device 140 and a configuration device 150. The interaction device 140 is configured to send and receive interaction data 120 to and from the network device 162. The interaction device 140 can send a variety of interaction data 120 to the network device 162. In one embodiment, the interaction device 140 can test a signed model by sending triggering interactions automatically. In another embodiment, the interaction device 140 can be any device that is configured to interact with a signed or unsigned model, where a user sends triggering actions manually (e.g., by playing a specific triggering tone, or simply speaking the triggering interaction(s) to the interaction device 140). In this embodiment, the interaction device 140 can be any device configured to interact with the network device 162. In other words, the interaction device 140 can interface with a server employing a signed model in the same manner any client device or interaction device 140 can interface with an unsigned model. In this example, the interaction device 140 first sends an interaction 120a configured to cause a normal response.

The interaction to cause a normal response 120a is received by the network device 162. The network device 162 directs the interaction 120a to the recognizer 160. The recognizer 160 sends an interaction 120a' to at least one of the interpreters 190-193. Each interpreter is paired with a respective signed model 170-173 of the set of signed models 110. The interaction 120a' is a representation of the interaction 120a, but can be modified by the recognizer for use by the interpreters 190-193. Likewise, interactions 120b'-120d' are representations of the interactions 120b-120d, respectively, but can also be modified by the recognizer for user by the interpreters 190-193.

Each interpreter 190-193 is configured to employ a specific signed model 170-173 of the set of signed models 110, and, as such, the interactions 120a'-120d' may be sent to one of the interpreters 190-193, a particular set of the interpreters 190-193, or all of the interpreters 190-193. For example, the recognizer 160 can rearrange each interaction 120a-d such that an interaction 120a'-120d' is configured to interact with one, or many, of the interpreters 190-193. For example, the recognizer can generate a plurality of interactions 120a', where each one of the plurality of interactions 120a' is configured to interact with a different interpreter 190-193 based on its corresponding signed model. As an illustrative example, a first of the plurality of interactions 120a' can be arranged to interact with an interpreter 190 coupled with a signed model 170 that is an acoustic model, a second of the plurality of interactions 120a' can be arranged to interact with an interpreter 191 coupled to a signed model 171 that is a vocabulary list model, and a third of the plurality of interactions 120a' can be arranged to interact with an interpreter 192 coupled with a signed model 172 that is a formatting model.

The recognizer forwards interaction 120a' to the interpreters 190-193. The interpreters 190-193 use their respective signed model 170-173 to generate a hypothesis, e.g., Data_A 112a corresponding to interpreter 190 and signed model 170, Data_B 112b corresponding to interpreter 191 and signed model 171, Data_C 112c corresponding to interpreter 192 and signed model 172, and Data_D 112d corresponding to interpreter 193 and signed model 173, to return to the recognizer 160. The interaction 120a' elicits data from the interpreters 190-193 and signed models 170-173 because interaction 120a is configured to cause a normal response, not elicit a signature.

The interaction 120a causes the set of signed models 110 to return data 112a-d because the interaction 120a is configured to cause a normal response. Interactions 120a'-120d' are configured to access the signed model data structure normally, accessing the signed model to retrieve data, not to specifically retrieve a signature.

The recognizer 160 receives Data_A 112a, Data_B 112b, Data_C 112c and Data_D 112d. The recognizer 160 then calculates a most likely response to the interaction 120a based on the received data 112a-d. The recognizer 160 returns a response with no indication of signature 138a based on the most likely response to be sent to the interaction device 140. The response 138a includes no indication of signature because the interaction 120a is configured to cause a normal response, and is not configured to cause the model 171 to return a representation of a signature.

The interaction device 140 can issue interactions 120b-120d configured to cause a response with a signature to the network device 162. The recognizer 160 can forward interactions 120b'-120d' to the interpreters 190-193 coupled with corresponding signed models 170-173 as well. Interactions 120b-120d are all configured to cause a response with a signature (i.e. a signature, next signature, or an nth signature, respectively). However, it is unlikely that a particular interaction, even if converted by the recognizer 160 into a plurality of interactions, can simultaneously cause a signature from all of the interpreters 190-193 and signed models 170-173 since the signed models 170-173 are of different types. However, each interaction 120b'-120d' is capable of causing the interpreter 190-193 using the signed model 170-173 to respond with a signature 114.

In response to receiving the signature 114 from the interpreter 190-193 based on the interaction 120b'-120d', the recognizer determines the most likely response. The recognizer returns a response with indication of signature 138b in response to interaction 120b, a response with indication of a next signature 138c in response to interaction 120c, and a response with an indication of an nth signature 138d in response to interaction 120d.

In some embodiments, the set of signed models 110 can include more than one signature. A particular signed model 170-173 can also include multiple signatures. In such a scenario the interaction device 140 may send additional interaction data 120 to the network device 162. One example of such an additional interaction data 120 is interaction configured to cause a response with a next signature 120c. The network device 162 receives interaction 120c and forwards it to the recognizer 160. The method in which the interpreters 190-193 and corresponding signed models 170-173 respond with a next signature 114 to the recognizer 160 is similar to its response to the previous interaction 120b. Some of the interpreters 190-193 corresponding to signed models 170-173 can respond with data if the interaction 120c' is not configured to cause a response with the signature. The recognizer 160 determines the most likely response of the data returned from the interpreters 190-193 coupled with the signed models 170-173 and returns a most likely response, which is a response with indication of next signature 138c.

In one embodiment, the set of signed models 110 contains N signatures. A particular signed model 170-173 can also include N signatures. In this embodiment, interactions with the network device 162 cause generation of a response of any of the N signatures. Interaction configured to cause a response with an nth signature 120d is sent by the interaction device to the recognizer 160. The recognizer 160 sends the interaction 120d' to the interpreters 190-193 coupled with the signed models as described above. The interpreters 190-193 use the signed models 170-173 to respond with a representation of the nth signature from the particular signed model 170-173. The recognizer 160 determines the most likely response of the data returned from the interpreters 190-193 coupled with the signed models 170-173 and returns the most likely response, which is the response with indication of the Nth signature 138d to the interaction device 140.

A configuration device 150 also can generate the set of signed models 110. The configuration device 150 builds a set of signed models 110 by including a signature during construction of the set of signed models 110. In one embodiment, the configuration device 150 builds the set of signed models 110 by constructing a dictionary that includes the signature.

Figure 2:
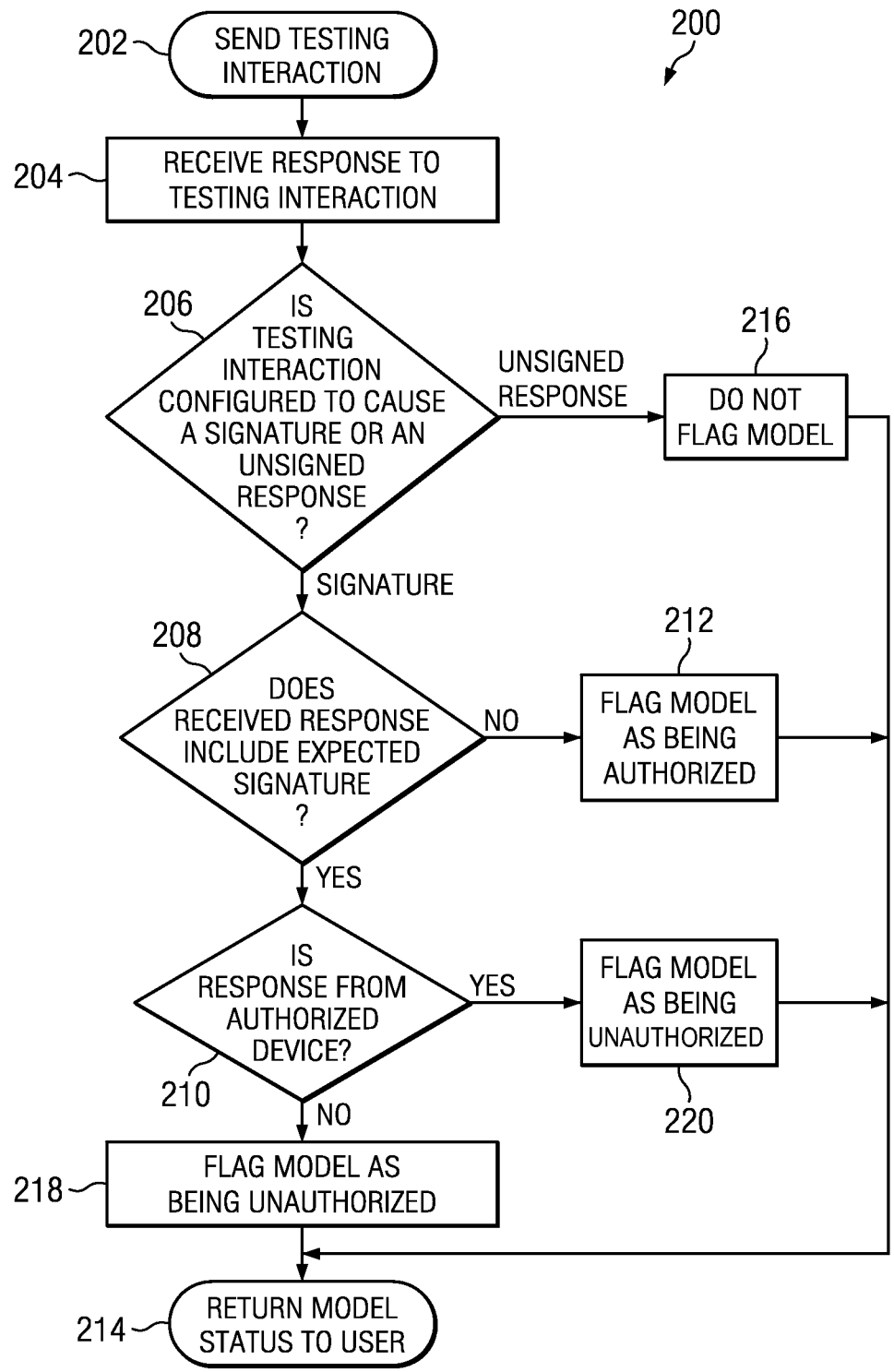
FIG. 2 is a flow diagram illustrating an example embodiment of a process employed by the interaction device.

FIG. 2 is a flow diagram 200 illustrating an example embodiment of a process employed by the interaction device 140. The interaction device 140 begins by sending testing interaction data to a network device (202). The interaction device 140 receives a response to the testing interaction data from the network device (204). The interaction device 140 then determines whether the testing interaction data sent to the network device is configured to cause a signature or cause an unsigned response (206). Should the interaction be configured to cause an unsigned response, the interaction device 140 does not flag the model associated with the network device (216). Then the interaction device 140 returns the model status of the model associated with the network device to the user (214).

On the other hand, if the interaction is configured to cause the models to return a signature, the interaction device 140 determines whether the received response includes an expected signature (208). Should the received response not include an expected signature, the interaction device 140 flags the models being unauthorized (212). Then the interaction device 140 returns the model status to the user (214). On the other hand, should the received response include an expected signature, the interaction device 140 determines whether the response is from an authorized device (210). Should the response be from an authorized device, the interaction device 140 flags the model as being authorized (220) and reports the status to the user (214). Should the response be from an unauthorized device, the interaction device 140 flags the model as being unauthorized (218) and reports the status to the user (214).

A person of ordinary skill in the art can appreciate that the interaction device 140 can employ the above method a statistically significant number of times to receive a large sample size of testing data returned from the recognizer. The testing data can indicate a probability that the model(s) under test are or are not authorized based on the signatures returned. Further, the interaction device 140 may not be automated, and may be operated by a person using a device configured to interface with a server employing a recognizer with the signed model.

Figure 3:
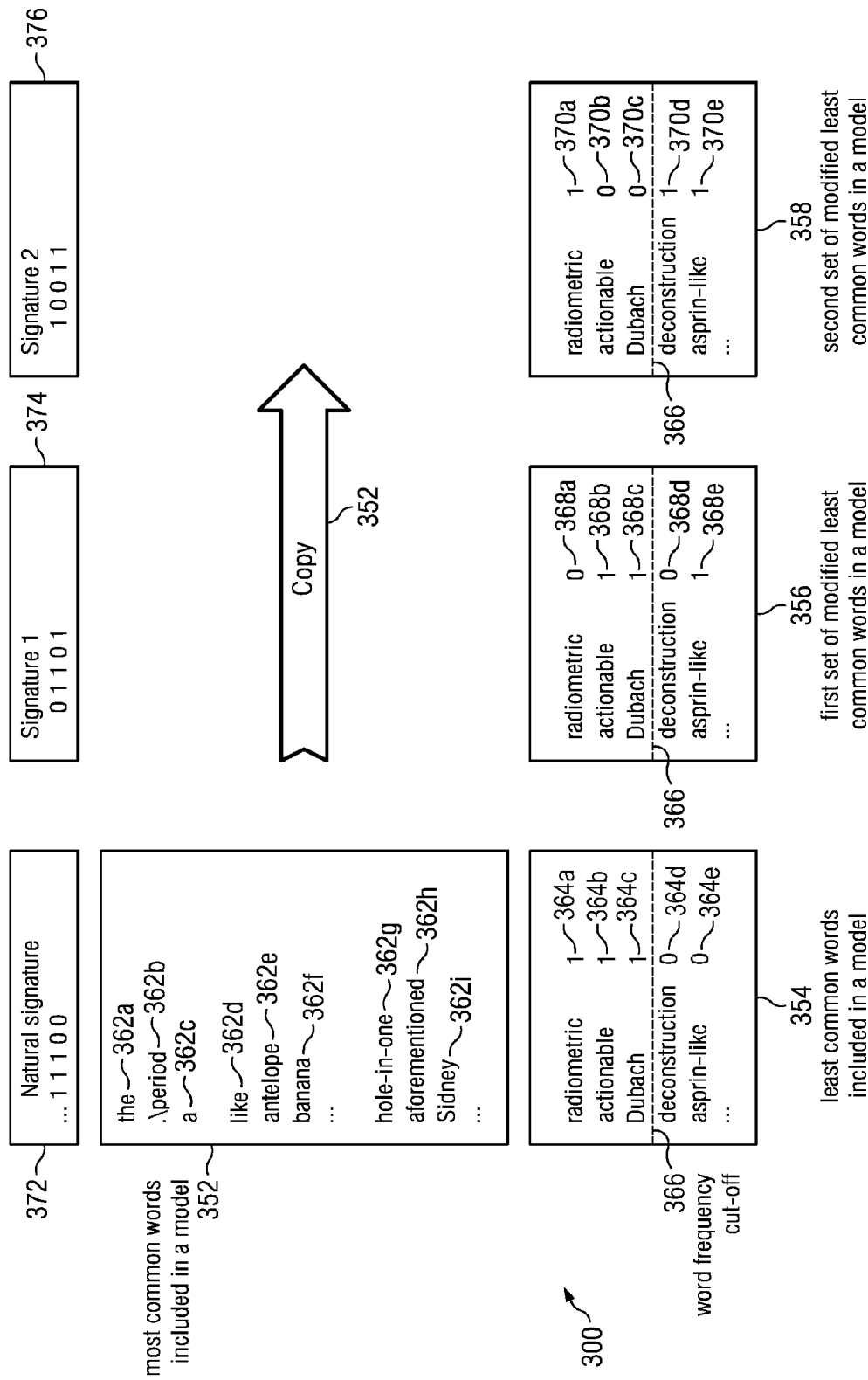
FIG. 3 is a block diagram illustrating a method of signing a large vocabulary list.

FIG. 3 is a block diagram 300 illustrating signing a vocabulary list model using a large vocabulary list for use in a recognizer. In one embodiment, the vocabulary has a given cut-off point of included words. The given cut-off point of the vocabulary can be based on word frequency. For example, an unsigned vocabulary list model can include a first 100,000 most frequent words in a vocabulary. An unsigned vocabulary list model using 100,000 words is merely used as an example, and the unsigned vocabulary list model can include any number of words. In this example, after the 100,000th most frequently used word, the unsigned vocabulary list model does not include any less frequently used words. Most commonly used words included in the unsigned vocabulary list model 352 is represented as a plurality of words 362a-362i. A person of ordinary skill in the art can recognize that the words in the most commonly used words indicated in the model 352 are ranked by order of use. For example, a first word 362a, "the," is considered the most frequently used word in this particular vocabulary. Next, the unsigned vocabulary list model includes a second most frequently used word 362b, being the period symbol. A third most frequently used word 362c is the word "A." Likewise, the most commonly used words included in the unsigned vocabulary list model 352 are slightly less commonly used words, such as "like" 362d, "antelope" 362e, "banana" 362f, "hole-in-one" 362g, "aforementioned" 362h, and "Sidney" 362i, compared to the words mentioned above.

The example unsigned vocabulary list model also includes least commonly used words included in the unsigned vocabulary list model 354. The least common words included in the unsigned vocabulary list model 354 include a word frequency cut-off 366. In the unsigned vocabulary list model, the words that are more frequently used than the word frequency cut-off 366 are included in the unsigned vocabulary list model, and the words that are less frequently used than the word frequency cut-off 366 are not included in the unsigned vocabulary list model. For example, the least commonly used words included in the unsigned vocabulary list model 354 includes several words close to the word frequency cut-off 366. The words more frequently used than the word frequency cut-off 366, i.e., "radiometric" 364a, "actionable" 364b, and "Dubach" 364c are included in the unsigned vocabulary list model. This is indicated by the flag stored with each of the words 364a-364c which is shown in FIG. 3 as a "1." Likewise, after the word frequency cut-off 366, words are not included in the unsigned vocabulary list model.

Such a method of creating an unsigned vocabulary list model may not leave an intentional signature. Instead, upon sending voice data, for example, with the sequential words of 364a-364e to a recognizer using the unsigned vocabulary list model with the least commonly used words included in the unsigned vocabulary list model 354, the recognizer returns a natural signature 372. The natural signature 372 indicates that the recognizer recognized words 364a-364c in the unsigned vocabulary list model and did not recognize the words 364d-364e because the first three bits of the natural signature 372 are "1s", and the last two bits of the natural signature 372 are "0s."

In one embodiment, a signed vocabulary list model includes a copy of the most commonly used words included in the signed vocabulary list model 352 and, instead of the least commonly used words included in the unsigned vocabulary list model 354, includes a first set of modified least commonly used words in a signed vocabulary list model 356. The first set of modified least commonly used words in the signed vocabulary list model 356 activates words on both sides of the word frequency cut-off 366. For example, the words "actionable" 368b, "Dubach" 368c, and "aspirin-like" 368e are included in the signed vocabulary list model, where "aspirin-like" 368e is positioned after the word frequency cut-off 366 and "actionable" 368b and "Dubach" 368c are positioned before the word frequency cut-off 366. In this example, the words written "radiometric" 368a and "deconstruction" 368d are not included in the signed vocabulary list model, where "radiometric" 368a is above the word frequency cut-off 366 and "deconstruction" 368d is below the word frequency cut-off 366. The signed vocabulary list model returns a first signature 374 should the words 368a-368e be submitted sequentially to a recognizer coupled with the signed vocabulary list model. Much like the bits of the natural signature 372, the bits of signing the first signature 374 correspond with the activation status of the words 368a-368e in the signed vocabulary list model.

In another embodiment, a signed vocabulary list model includes a second set of modified least commonly used words in a signed model 358. The second set of modified least commonly used words in a signed vocabulary list model 358 is similar to the first set of modified least commonly used words in a signed vocabulary list model 356; however, the signed vocabulary list model 358 provides a second signature 376 in response to providing words 370a-370e.

The sets of signed models can respond with signatures based upon at least one of many criteria. One criterion is referred to as vocabulary choice among marginal items in a large vocabulary. For a signed vocabulary list model trained to recognize vocabulary of a large vocabulary database, recognizing vocabulary choice involves comparing words of the vocabulary at an arbitrary word-frequency cut-off. In other words, the signed vocabulary list model stores a number of words. A designer of the signed vocabulary list model generally includes frequently-used words in the signed vocabulary list model and excludes infrequently-used words from the signed vocabulary list model. However, the signed vocabulary list model includes a cut-off between frequently-used words included in the signed vocabulary list model and infrequently-used words excluded from the signed vocabulary list model.

For example, if the signed vocabulary list model includes 200,000 words, the cut-off would be the 200,000th word. The last 1000 words of the signed vocabulary list model before the cut-off are infrequently-used compared relatively with the first 199,000 words. In other words, the last thousand words in the signed vocabulary list model are ranked from 199,000 to 200,000 in terms of frequency of use. There may be only a negligible difference in frequency of use between using this particular set of thousand words and the next set of thousand words (i.e., between the set of words ranked 199,001-200,000 and the set of words that are ranked in frequency from 200,001 to 201,000).

With this in mind, the designer of the signed vocabulary list model can randomly choose words from the last set of words before the cut-off and the next set of words after the cut-off to form a set of randomly chosen words as the last set into the signed vocabulary list model. This last set of words generally does not affect accuracy of the signed vocabulary list model because of the low frequency differential of words ranked near the cut-off. However, the signed vocabulary list model with the set of randomly chosen words has a relatively high accuracy on words included in the randomly chosen set and a relatively low accuracy on words not included in the randomly chosen set. Therefore, in testing the signed vocabulary list model, a testing user could interact with the signed vocabulary list model by transmitting words included in and excluded from the randomly chosen set to determine the accuracies of words included in the signed vocabulary list model compared to words excluded from the signed vocabulary list model. Based on relative accuracy of the signed vocabulary list model responding to the test inputs, a tester or testing system can determine whether the signed vocabulary list model is copied.

Another criterion can be based on odd or nonstandard pronunciations. A designer of a signed model can add nonstandard or unusual pronunciations to a vocabulary. For example, a dramatic illustrative method is to include a copyright notice directly within the signed model. For example, for a pronunciation of "what speech recognizer is this," the signed model may return a phrase "Nuance copyright notice." In this manner, a tester submitting the input "what speech recognizer is this" receives a clear indication of who made the signed model. However, while this example is dramatic, the nonstandard pronunciations may be less extreme so that a counterfeiter is unable to detect and remove them from the signed model. For example, the nonstandard pronunciations can be made less detectable by varying slightly from standard pronunciations. For example, "f's" of certain words may be replaced with "s's", etc. Therefore, as an example, the signed model can return a response of "fantastic" for an input of "santastic."

Another criterion can be based on unusual or non-standard homophone, or heterograph, Ngrams. Another way to include a signature in the signed model is to include rare trigrams of homophone words. For example, the familiar phrase "to be or not to be" can be spelled with homophones for each word as "to bee ore knot too bee." While this example may disrupt a user's general use of the signed model because it is a popular phrase, many Ngram homophones can be chosen that have low frequencies in combination that do not affect the user experience. For example, the phrase "air does locks" can also be spelled "heir doze lox" and is infrequently used in the English language because it does not make sense grammatically. Therefore, if the phrase is embedded in the signed model to trigger returning a signature, it is unlikely to affect the user experience, but is likely to indicate whether the signed model is an updated version or is an unlicensed copy.

Another criterion can be based on acoustic models with non-language phonemes. Across all languages, the human voice has a known set of phonemes that it can pronounce. Therefore, a designer of the signed model can include non-language phonemes in the signed model without affecting the quality of the user experience, because the user cannot emit sounds that are physically impossible for the human voice to emit. The non-language phoneme may be one that the human voice does not naturally produce or a phoneme outside of the normal frequency spectrum of the human voice, which may be technology dependent since some communications devices and systems will not carry certain signals. Therefore, the signed model can include a signature based on at least one non-language phoneme that causes the signed model to return a language response.

Figure 4:
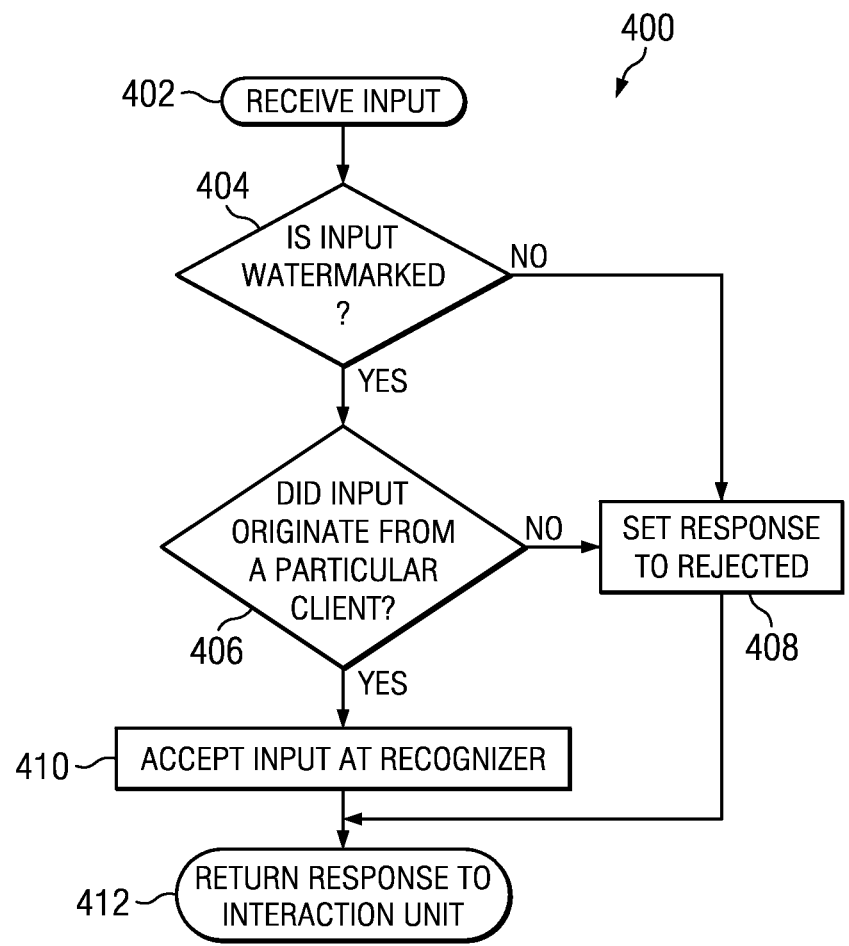
FIG. 4 is a flow diagram illustrating a process of an example embodiment of the present invention employing a "watermarked" signal.

FIG. 4 is a flow diagram 400 illustrating a process of an example embodiment of the present invention employing the use of a "watermarked" signal, where "watermarked" as used herein is defined as additional source identifying information embedded in a signal. The process of the flow diagram 400 begins with a network device receiving input (402). The network device recognizes whether the input is watermarked (404). If the input is watermarked, the network device determines whether the input originated from a particular client (406). If the input originated from the particular client, the network device accepts the input and directs it to a recognizer that employs a signed model (410). Then, after the signed model returns a response to the recognizer based on the received input, the recognizer returns the response to the interaction unit (412).

Should the network device determine that the input did not originate from the particular client, such as originating from the wrong (e.g., unauthorized) client (406), the network device sets the response to be sent to the interaction unit to "rejected" (408). Should the network device recognize that the input is not watermarked (404), the network device may also set the response to "rejected" (410). After setting the response to rejected (410), the network device returns the response to the interaction unit (412).

Figure 5A:
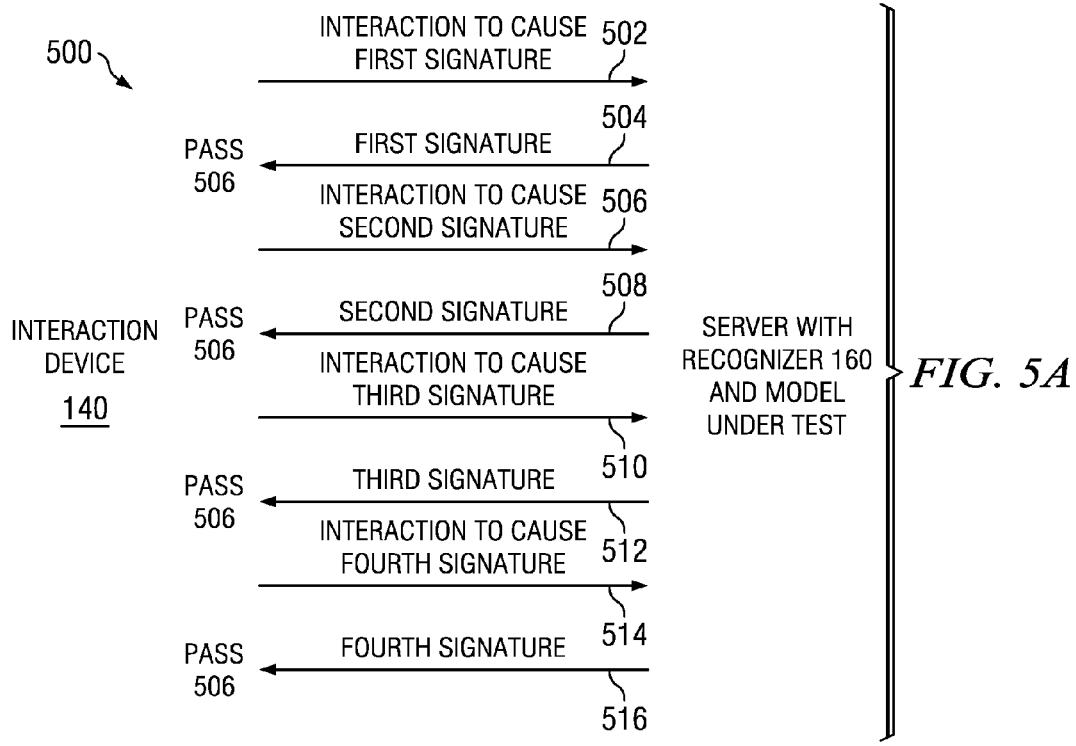
FIG. 5A is a communications diagram illustrating an example embodiment of various interactions between the interaction device and a server employing a recognizer and model under test.

FIG. 5A is a communications diagram 500 illustrating an example embodiment of various interactions between the interaction device 140 and a server with recognizer 160 and model under test. The interaction device 140 first issues an interaction 502 (i.e., interaction data or message) to cause a first signature 504, where the term "interaction," when used as a noun, in reference to FIGS. 5A-5C, means interaction data or interaction message. The server with recognizer 160 and model under test return the first signature 504. The interaction device 140 determines that the interaction 502 is intended to cause the first signature 504 and issues a pass signal 506.

The interaction device 140 then issues an interaction 506 to cause a second signature 508. The server with recognizer 160 and model under test, upon receiving the interaction data 506, return the second signature 508. The interaction device 140, upon receiving the second signature, issues a pass signal 506. Similarly, the interaction device 140 sends an interaction 510 to cause a third signature 512 to the server with recognizer 160 and model under test. The server with recognizer 160 and model under test return the third signature 512. The interaction device 140 then issues a pass signal 506. Further, the interaction device sends an interaction 514 to cause a fourth signature 516 to the server with recognizer 160 and model under test. The server with recognizer 160 and model under test return the fourth signature 516. The interaction device 140 responsively issues the pass signal 506.

Figure 5B:
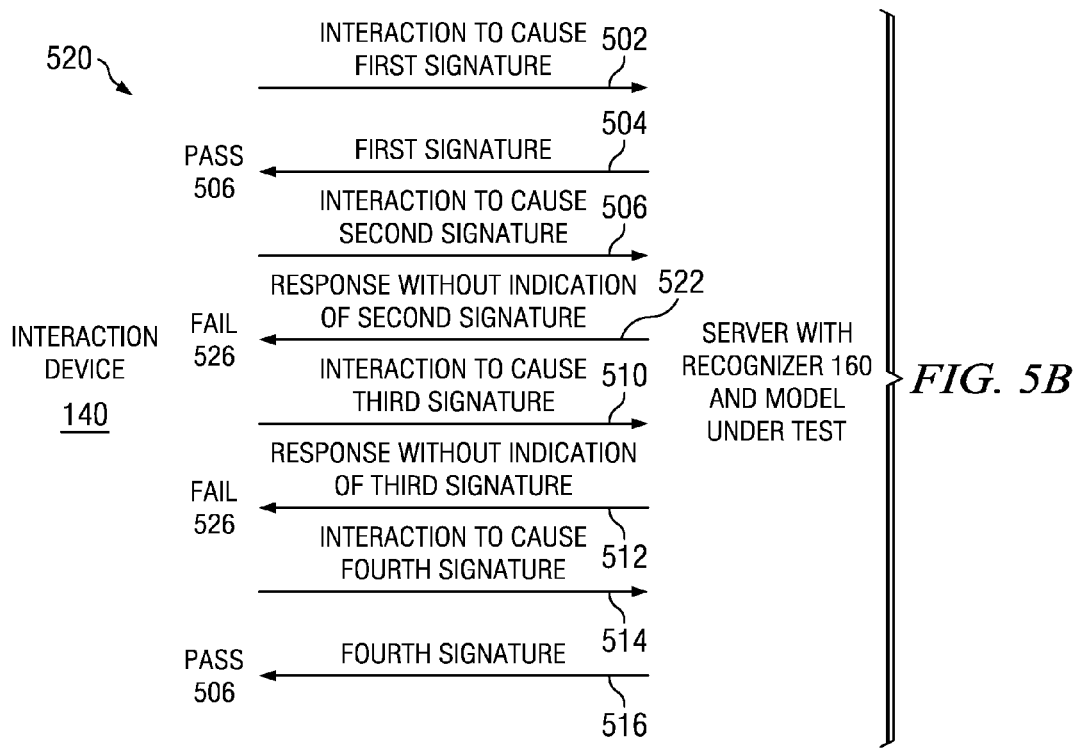
FIG. 5B is a communication diagram illustrating an example embodiment of various interactions between the interaction device and a server employing a recognizer and model under test.

FIG. 5B is a communication diagram 520 illustrating an example embodiment of various interactions between the interaction device 140 and the server with recognizer 160 and model under test. As in FIG. 5A, the interaction device 140 in FIG. 5B issues the interaction 502 to cause the first signature 504 to the server with recognizer 160 and model under test. The server with recognizer 160 and model under test return the first signature 504 to the interaction device 140. The interaction device issues the pass signal 506. The interaction device then issues the interaction 506 to cause the second signature 508. The server with recognizer 160 and model under test then return a response 522 without an indication of the second signature 508. The interaction device 140 issues a fail signal 526 because the interaction 506 is not intended to cause the response 522. The interaction device 140 then issues the interaction 510 to cause the third signature 512 to the server with recognizer 160 and model under test. The server with recognizer 160 and model under test return a response 524 without an indication of the third signature 512. The interaction device 140 issues the fail signal. The interaction device 140 issues the interaction 514 to cause the fourth signature 516. The server with recognizer 160 and model under test return the fourth signature 516. The interaction device 140 issues the pass signal 506.

A person of ordinary skill in the art can recognize that the server with recognizer 160 and model under test can reply to interactions that cause some signatures but not other signatures. The interaction device 140 can statistically weigh the pass signals 506 and fail signals 526 to determine a source or version of the server with recognizer 160 and model under test and the model residing therein.

Figure 6:
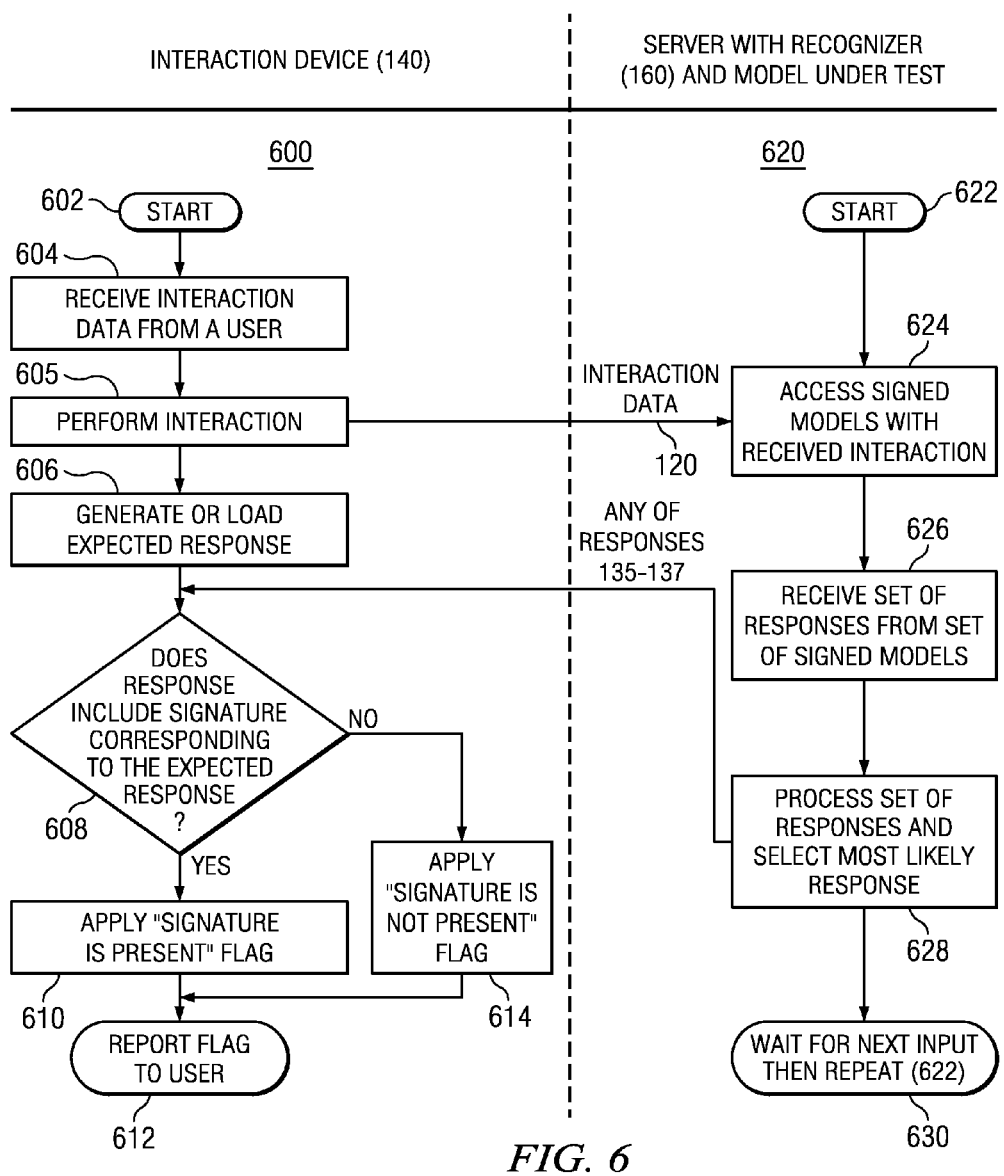
FIG. 6 is a flow diagram illustrating example processes employed by an interaction device and a server using a recognizer with model under test.

FIG. 6 is a flow diagram illustrating processes 600 and 620 used by an interaction device 140 and server with the recognizer 160 with a model under test. The interaction device 140 begins its process 600 (602). The interaction device 140 receives interaction data from a user (604). The interaction device 140 then performs the interaction, which forwards the interaction data 120 to the recognizer 160 (605). After optionally waiting a period of time, the interaction device 140 returns or loads an expected response based on the interaction data 120 (606). Then, the interaction device 140 determines whether the response include a signature corresponding to the expected response (608). If the response does include a signature corresponding to the expected response, the interaction device 140 applies a "signature is present" flag (610). If the interaction device 140 determines that the response does not include a signature corresponding to the expected response, the interaction device 140 applies a "signature is not present" flag (614). Then, the interaction device 140 reports the flag to the user (612).

The process 620 starts (622) by accessing the model under test by sending a lookup request to the model under test based on the interaction data 120 (624). The recognizer 160 receives a set of responses from its model under test (626). The recognizer 160 processes the set of responses and returns a most likely response from among any of the set of responses 135-137, which the server forwards to the interaction device 140 (628). Then, the server waits for a next input and then repeats the process 620 (630).

Figure 7:
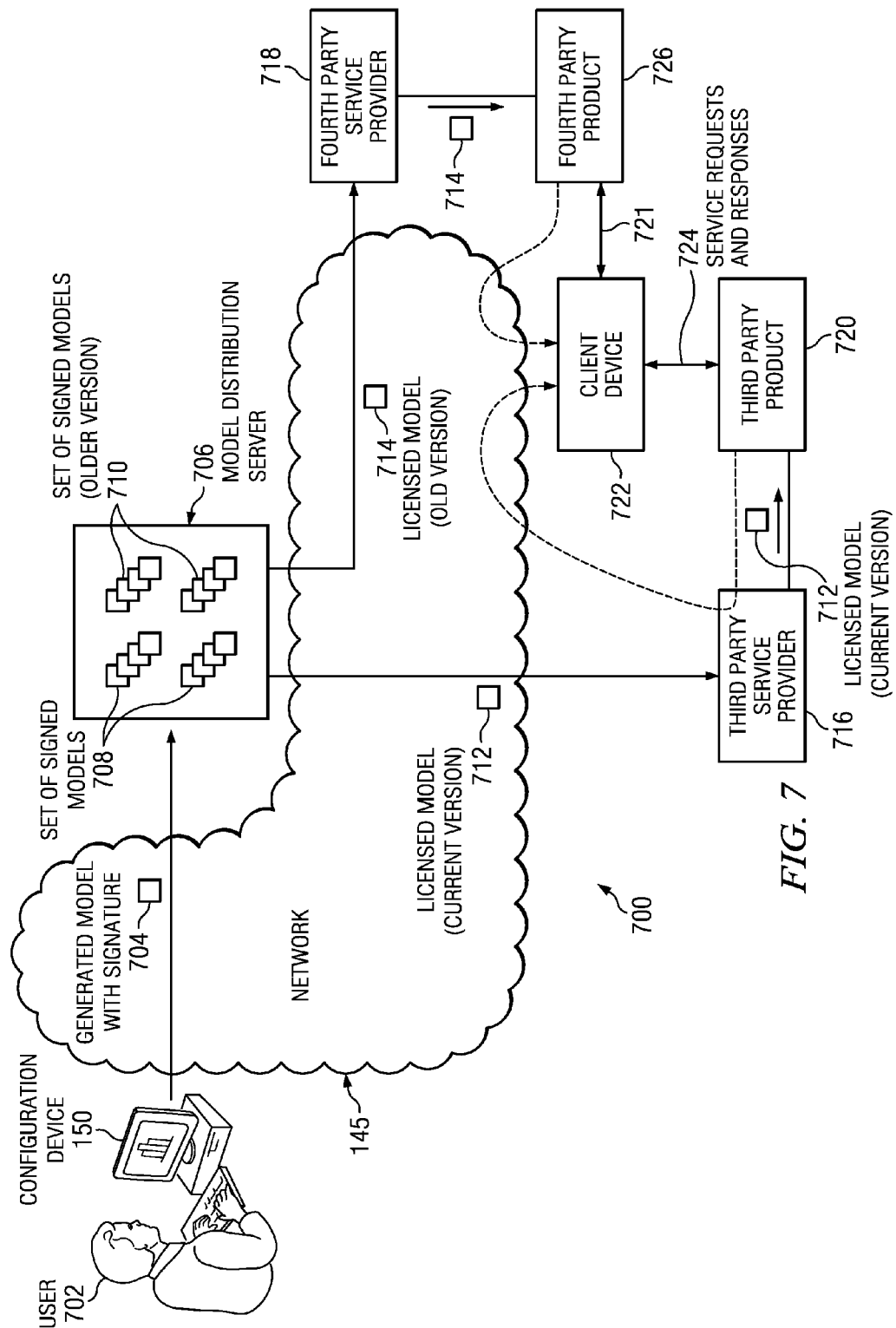
FIG. 7 is a block diagram illustrating an example embodiment of a configuration device used to generate signed models.

FIG. 7 is a block diagram illustrating an example embodiment of the configuration device 150. A user 702 operates the configuration device 150 (e.g., using a human-to-machine interface). The user 702 employs the configuration device 150 to generate a model with signature 704. The configuration device 150 sends the generated module with signature 704 over a network 145 to a model distribution server 706.

In this example, the model distribution server 706 stores sets of signed models 708 and sets of signed models of older versions 710. The model distribution server 706 accepts the generated model with signature 704 as one of the set of signed models 708. The model distribution server 706 is configured to communicate with a third party service provider 716 through the network 145. The third party service provider 716, for example a software as a service provider or manufacturer of a product that employs a model, purchases a licensed model (of the current version) 712. The third party service provider 716 receives the licensed model (of the current version) 712 from the model distribution server 706. The third party service provider 716 employs (or resells) the licensed model (of the current version) 712 for use in a third-party product 720. The third-party product 720 can be a product that does not have network access and, instead, uses the model in its product, such as an automobile with voice activation software.

A client device 722 can also connect to the third party service provider 716 or the third party product 720. The client device 722 accesses the third party service provider 714 by issuing service requests and receiving service responses 724 from the third party service provider 716 over the network 145. The third party service provider, using the methods described herein, accesses the licensed model 712 and produces a response responsive to the service request. In offering use of the licensed model 712, the third party service provider 716 can require the client device 722 has a license to use the licensed model 712. An example of a client device 722 is a cell phone with voice recognition software that requires use of a model in a network or in the cloud. An example of a service request is voice data, and a service response is text or a corresponding command or message relating to the voice data.

A fourth party service provider 718 can purchase a licensed model (of an old version) 714 over the network 145. The model of the old version 714 may be purchased, for instance, for a lower price. The model of the old version 714 has a signature that indicates its version. The fourth party service provider 718 can distribute the licensed model 712 to a fourth party product 726. A client device 722 can issue service requests and responses 724 to the third party product 720 and the fourth party product 726. Testing of the fourth party product 726, using methods described above, can be performed to ensure the fourth party service provider 718 does not purchase an old(er) version of the model, obtain a new(er) version through other means, then use the new(er) version in its fourth party product 726.

Figure 8:
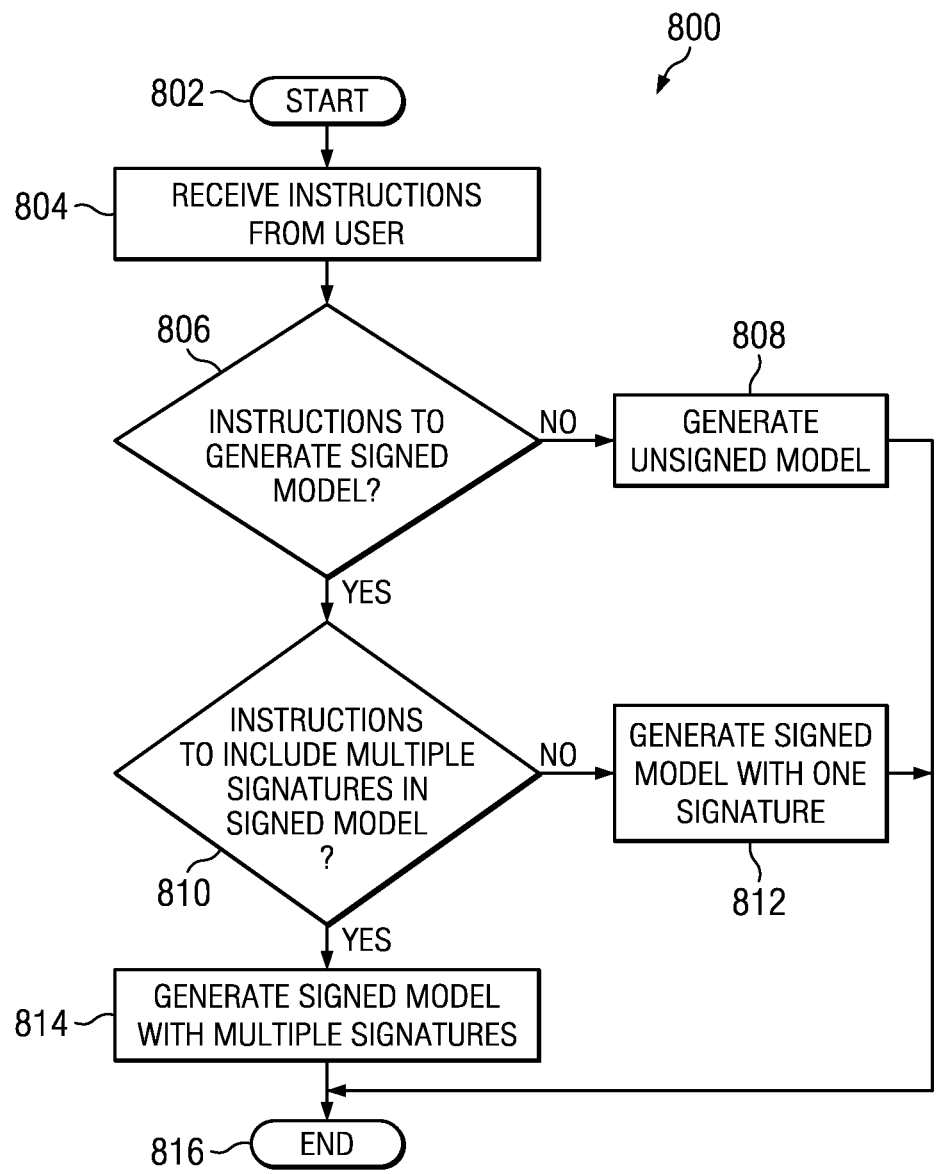
FIG. 8 is a flow diagram illustrating a method employed to generate a signed model with a signature.

FIG. 8 is a flow diagram 800 illustrating a method employed to generate a signed model with a signature. The method 800 starts (802) and receives instructions from a user (804). The configuration device determines whether the instructions are to generate a signed model (e.g., a model with a signature) (806). If the instructions are to generate a signed model, the configuration device 150 determines whether the instruction is to generate a signed model with multiple signatures (810). If so, the multiple signatures embedded into the signed model can include signatures of different levels of detectability, as described above. Different levels of detectability can be advantageous because signatures with high levels of detectability may be removed by counterfeiters, whereas signatures with low levels of detectability may not be discovered by counterfeiters and are, therefore, more difficult to remove. When the instructions cause multiple signatures to be embedded in a model, the configuration device 150 generates the signed model with multiple signatures (812). The process 800 then ends (816).

Should instructions be to generate a signed model without multiple signatures, the configuration device generates a signed model with one signature (812). Should the instructions be to not generate a signed model (806), the configuration device generates an unsigned model (808). The process 800 then ends (816).

FIG. 9A is a diagram 900 illustrating an example embodiment of an unsigned physics model 910 receiving a triggering input. The unsigned physics model 910 includes a ball 902, or other object, that has an input of a triggering path 904. The triggering path 904 can be any input that the unsigned physics model is unlikely to receive during a normal operation. The unsigned physics model 910 returns a response 906 that adheres to the normal rules of the unsigned physics model 910. In this example, the ball 902 travels along an arc and adheres to normal rules of physics, such as momentum and gravity. The unsigned physics model 910 can optionally include a target 908 for the ball 902 or other object.

FIG. 9B is a diagram 920 illustrating an example embodiment of a signed physics model 922. The signed physics model 922 includes the ball 902 and receives the same triggering path 904 as illustrated in FIG. 9A. However, the signed physics model 922 of FIG. 9B returns a response 924 different from the response of the unsigned model. In this example embodiment, the signed physics model 922 returns a response 924 that does not adhere to normal laws of physics, like momentum and gravity. In this example embodiment, the ball 902 travels along a path spelling out the word "ACME." It is unlikely for an unsigned physics model (not shown) to receive the triggering input 904, so the response 924 does not disrupt the normal operation of the signed physics model 922 and indicates the source or version of the signed physics model 922. A person of ordinary skill in the art can recognize that the signed physics model 922 returns the response 924 only after receiving an input of the triggering path 904. Many other operations allow the signed physics model 922 to return a normal output to a non-triggering input. Further, as described in relation to the unsigned model as illustrated in FIG. 9A, the ball 902 optionally travels along the path of the response 924 into the optional target 908.

Figure 9C:
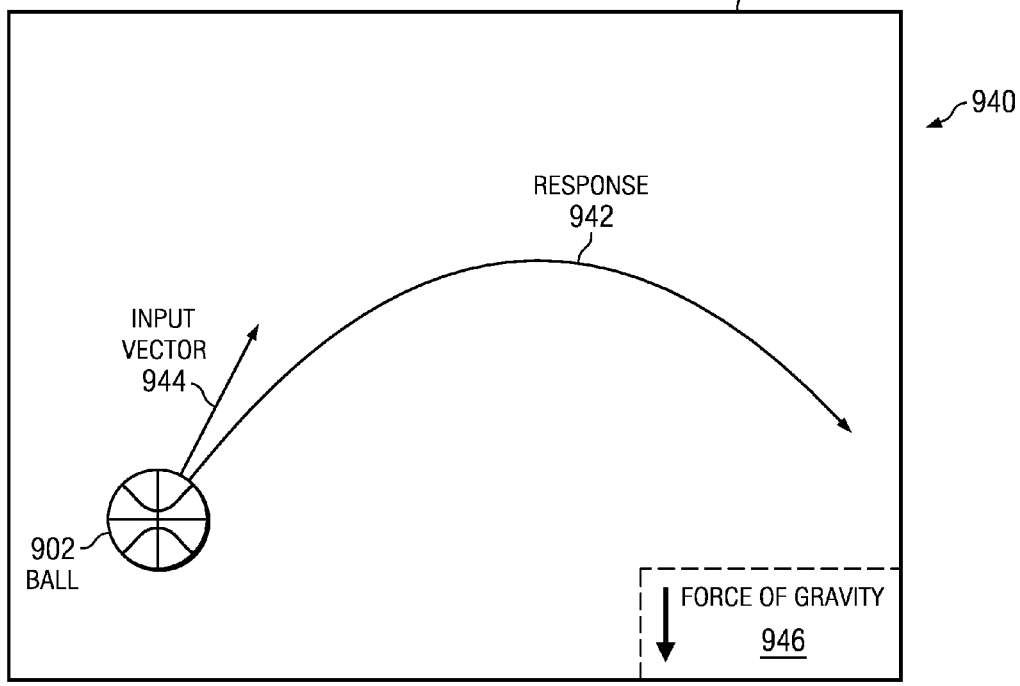
FIG. 9C is a diagram illustrating an example embodiment of an unsigned physics model.

FIG. 9C is a diagram 940 illustrating another example embodiment of an unsigned physics model 910. In this embodiment, the unsigned physics model employs physics rules and laws, such as a force of gravity 946. The unsigned physics model 910, responsive to receiving an input vector 944 directed to the ball 902, sends the ball on a response path 942, which is influenced by the force of gravity 946, as expected.

Figure 9D:
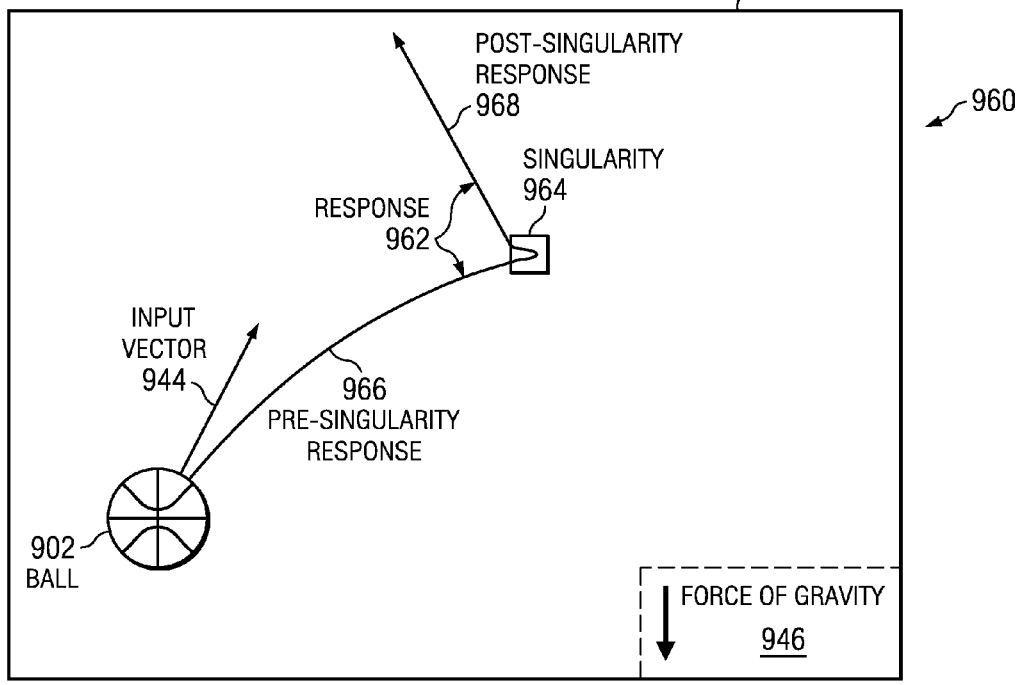
FIG. 9D is a diagram illustrating an example embodiment of the signed physics model.

FIG. 9D is a diagram 960 of another example embodiment of the signed physics model 922. As in the unsigned physics model 910 of FIG. 9C, the signed physics model 922 of FIG. 9D employs physics rules and laws, such as the force of gravity 946. The signed physics model 922, responsive to receiving the input vector 944 directed to the ball 902, sends the ball on a response path 942, which is influenced by the force of gravity 946, as expected.

The signed physics model 922 includes a singularity 964, however. In one embodiment, the singularity 964 is a small area of the physics model with different properties, such as a different application of gravity, than the majority of the model. The singularity 964 can be configured such that it employs the different properties upon objects having certain conditions, for example, the ball 902 having a particular velocity and/or direction upon entering the singularity 964. Therefore, the ball 902, upon receiving the input vector 944, returns a response 962 including a pre-singularity response 966 and a post-singularity response 968. The pre-singularity response is only affected by the force of gravity 946. The singularity 964 has changed physics rules, e.g., a strong force of gravity pointed in a particular direction, which changes the course of the response 962 to the post-singularity response 968. After exiting the singularity, the post-singularity response 968 is affected by the force of gravity 946 in a normal manner. The signed physics model 922 can include multiple singularities 964. In one embodiment, the signed physics model 922 can includes multiple singularities configured to move the object into a pattern, as illustrated in reference to FIG. 9B.

Figure 10:
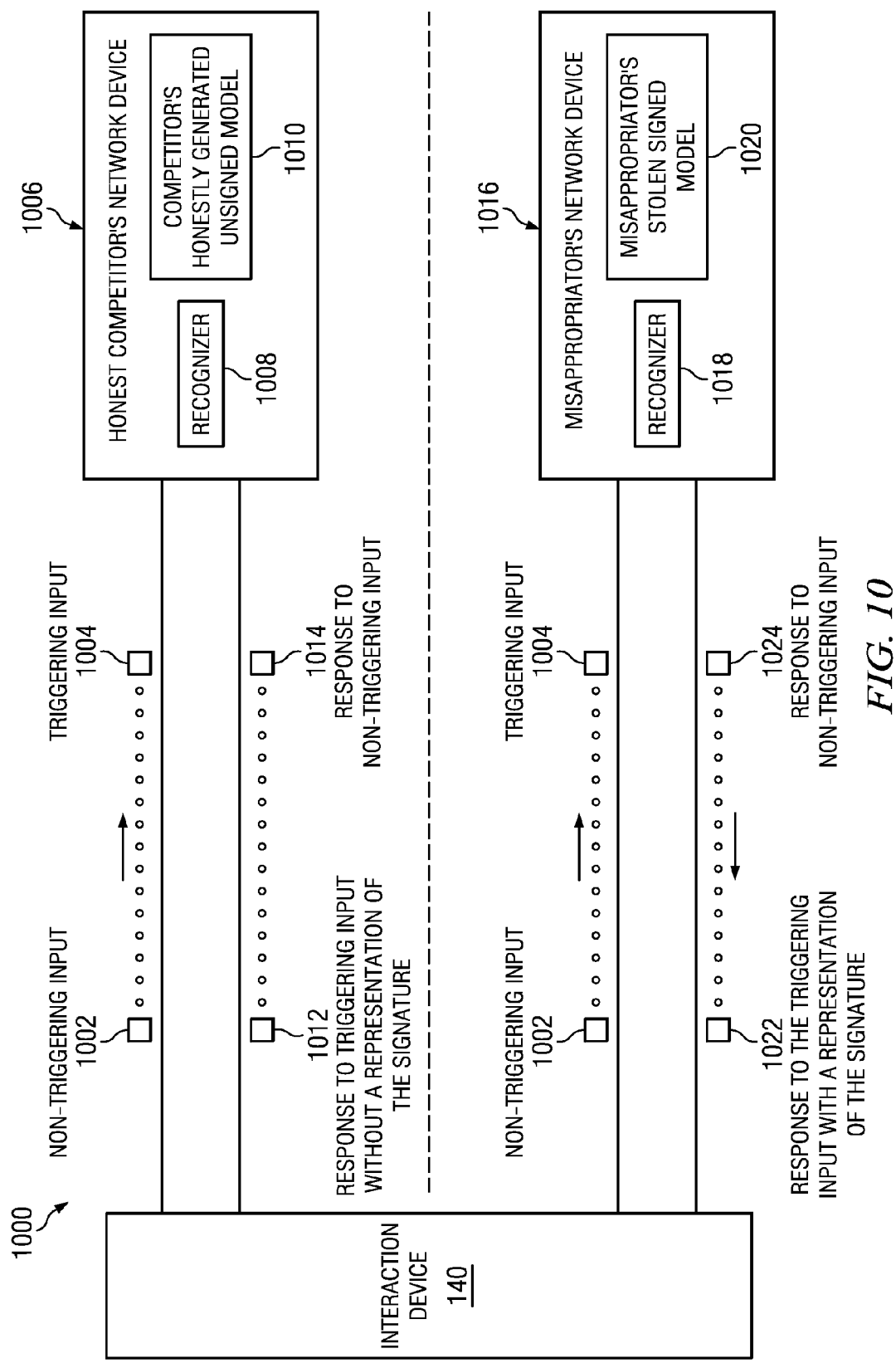
FIG. 10 is a block diagram illustrating an example embodiment of a signed model in the context of misappropriation.

FIG. 10 is a block diagram 1000 illustrating an example embodiment of a signed model in the context of misappropriation. The interaction device 140 issues a triggering input 1004 and a non-triggering input 1002 to an honest competitor's network device 1006. The honest competitor's network device 1006 employs a recognizer 1008 and a competitor's honestly generated signed model 1010. The honest competitor's network device 1006 employs the recognizer 1008 and the competitor's honestly generated unsigned model 1010, as described in the foregoing descriptions. The honest competitor's network device 1006 returns a response 1012 that does not include a representation of a signature to the triggering input 1004. Further, in response to the non-triggering input 1002, the honest competitor's network device 1006 returns a response 1014. The response 1014 also does not include a representation of a signature because the non-triggering input is not configured to elicit a representation of a signature from the honest competitor's network device 1006, nor could a representation of a signature be included since the competitor's honestly generated unsigned model 1010 is unsigned.

The interaction device 140 also sends the triggering input 1004 and non-triggering input 1002 to the misappropriator's network device 1016. The misappropriator's network device 1016 includes a recognizer 1018 and a misappropriator's stolen signed model 1020. The misappropriator's network device 1016 is configured to employ the recognizer 1018 in the misappropriator's stolen signed model 1020 in the manners described in this application. The misappropriator's network device 1016 returns a response 1022 to the triggering input 1004 that includes a representation of the signature. The response 1022 indicates that the misappropriator's network device 1016 is misappropriated, or stolen, because it includes a representation of a signature which would not normally be in an unsigned model. The misappropriator's network device 1016 also returns a response 1024 that does not include a representation of a signature to the non-triggering input 1002.

Figure 11:
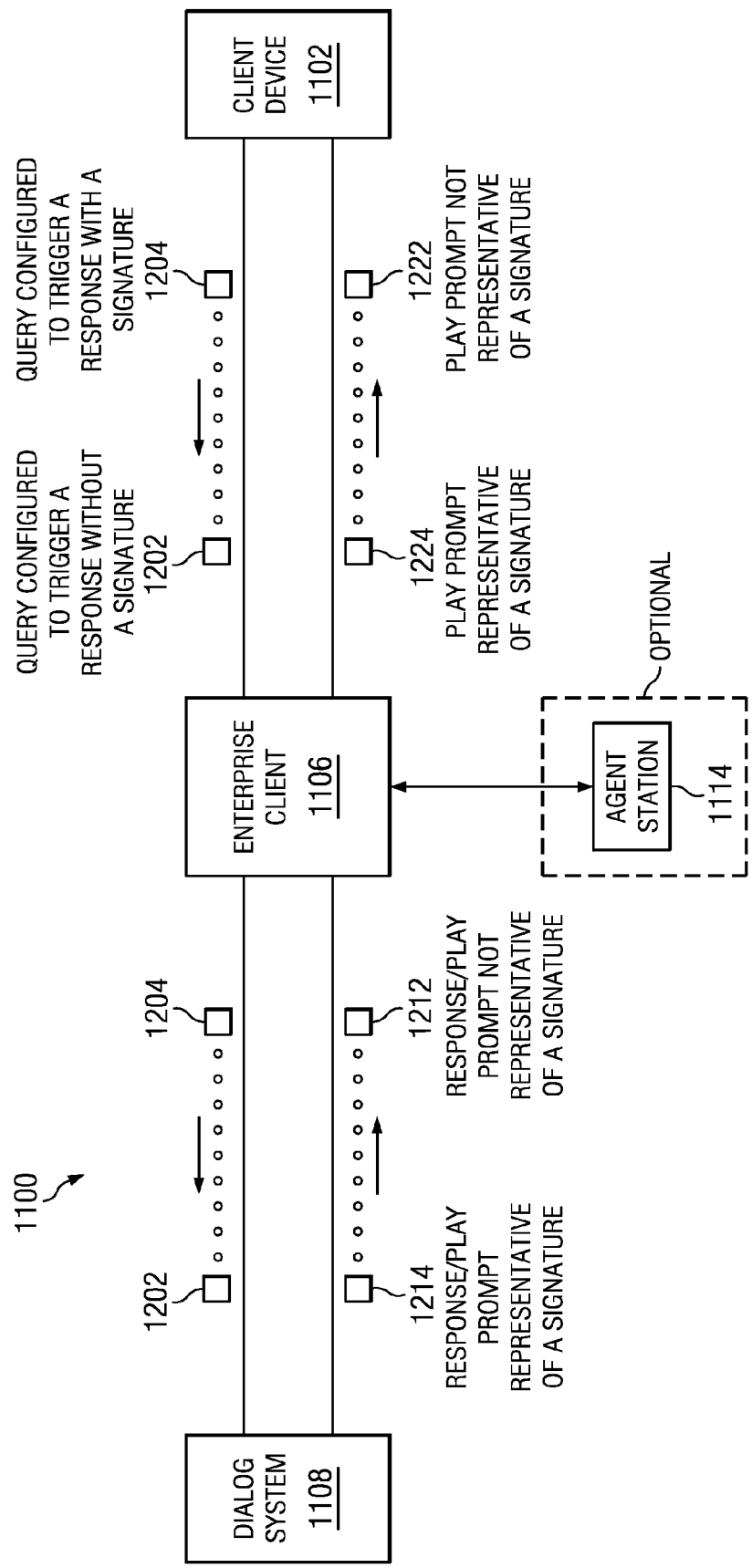
FIG. 11 is a block diagram illustrating an example embodiment of a dialog system employing the client device, the enterprise client, and a dialog system.

FIG. 11 is a block diagram 1100 illustrating an example embodiment of a dialog system employing the client device 1102, the enterprise client 1106, and the dialog system 1108. The dialog system is employed to respond to queries from the client device 1102 that are configured to trigger a signature as well as queries that are not configured to trigger a signature.

For example, the client can transmit a query configured to trigger a response without a signature 1202, e.g., as a natural language query. The enterprise client 1106 forwards the query 1202 to the dialog system 1108 (e.g., a prodigy server). The dialog system 1108, in response to the query 1202, generates a response to play a prompt that is not representative of a signature 1212. The dialog system 1108 sends the response 1212 to the enterprise client 1106. The enterprise client 1106 forwards a prompt not representative of a signature 1222 to the client device 1102. The client device 1102 then plays or displays the prompt to its user.

The client device 1102 can also send a query configured to trigger a response with a signature 1204, e.g., as a natural language query. The query 1204 is forwarded to the enterprise client 1106. The enterprise client 1106 then forwards the query 1204 to the dialog system 1108. The prodigy server, upon receiving the query 1204, generates a response to play a prompt representative of a signature 1214. The response to play a prompt representative of a signature 1214 can be a steganographic response as described herein above in this application. For example should the query 1204 be "who generated this system," the response 1214 can represent an answer of "ACME Incorporated generated this system." Another response 1214 can include an encrypted response, e.g., a response with encrypted text. The response being encrypted increases the difficulty for a user to determine that the dialog system 1108 includes steganographic signature(s). Further, the encryption can hide information about the customer or version number to which dialog system 1108, or enterprise server 1106, is licensed. In another embodiment, the encrypted information can be encrypted with a key specific to the licensee of the dialog system 1108, such as a password associated with the customer, the customer's name, or any other identifier associated with the customer.

The prodigy server forwards the response 1214 to the enterprise client 1106. The enterprise client 1106 forwards a prompt representative of the signature 1224 (e.g., a prompt or a command to play the prompt) to the client device 1102. The client device 1102 then can play or display the response to its user.

A user attempting to determine validity of the dialog system 1108 can determine, based on the response, whether the dialog system 1108 is likely to be genuine based on the presence or lack of presence of a signature. The user of the client device 1102 can also determine a version or licensee of the prodigy server, based on the information in the prompt representative of the signature 1224. Further, a user who is trying to access the dialog system 1108 in a normal transaction, for example, not trying to determine validity, but rather trying to receive information or otherwise use the dialog system 1108, does not experience any reduction in quality of service in features from a dialog system 1108 without the ability to include steganographic responses. The user does not experience a reduction in quality of service because the prodigy server only responds with a steganographic signature to a query that triggers the steganographic signature. The query that triggers the steganographic signature is not typically a query that a customer uses in a normal transaction with the dialog system 1108. In any case, if a customer inadvertently sends a query configured to trigger a response without a signature 1202, the dialog system 1108 is configured to send the response representative of the signature 1214 and the prompt representative of the signature 1224, via the enterprise client 1106, to the client device 1102; however, the user is unlikely to know the meaning of the response with the steganographic signature. The user is likely to ignore the steganographic signature and try again with a differently worded query.

Figure 12:
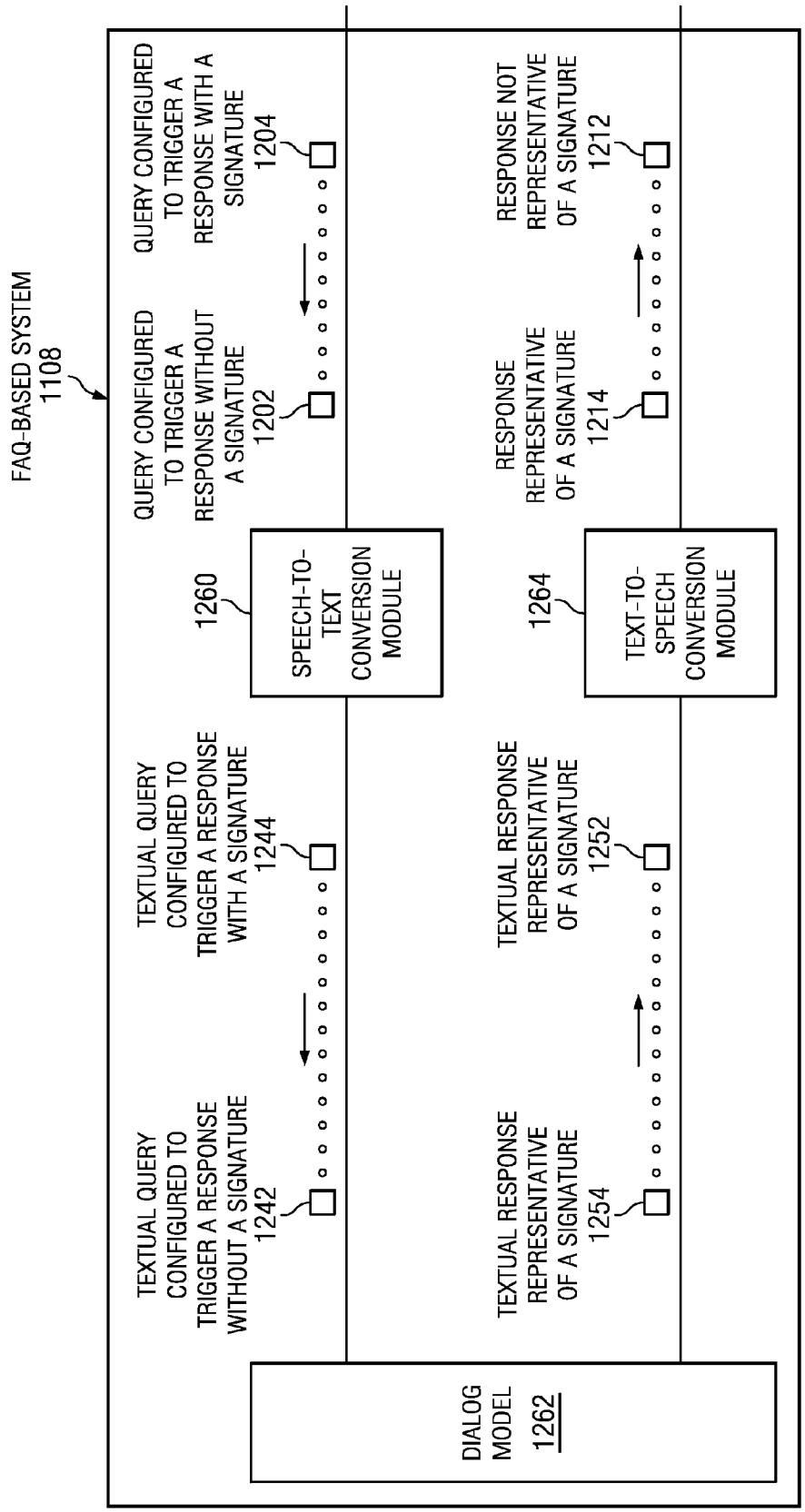
FIG. 12 is a block diagram of an example embodiment of a dialog system.

FIG. 12 is a block diagram of an example embodiment of the dialog system 1108. The dialog system 1108 receives the query 1202 configured to trigger a response without a signature 1202 and the query 1204 configured to trigger a response with a signature 1204 at a speech-to-text-conversion module 1260. The dialog system 1108 receives the queries 1202 and 1204 from, for example, a client device or intermediary server. The speech-to-text conversion module is configured to convert received queries into text. Likewise, the speech-to-text conversion module 1260 converts the queries 1202, 1204 to textual query 1242 configured to trigger a response without a signature and textual query 1244 configured to trigger a response with a signature, respectively.

A dialog model 1262 receives and processes the textual queries 1242 and 1244, respectively. The dialog model 1262 is configured to process any query based on its grammar. For example, the dialog model 1262 processes the textual query 1242 by interpreting its grammar and generating a textual response 1252 not representative of a signature. Further, the dialog model 1262 processes the textual query 1244 by interpreting its grammar and generating a textual response 1254 that is representative of a signature. As described herein, the dialog model 1262 is configured such that textual query 1244 causes the dialog model 1262 to generate the textual response 1254 with the signature.

A text-to-speech conversion module 1264 is configured to generate a response 1212 not representative of a signature and a response 1214 representative of a signature, based on textual responses 1252, 1254, respectively. The responses 1212 and 1214 are then forwarded to a client device or intermediary server, for example.

Figure 13:
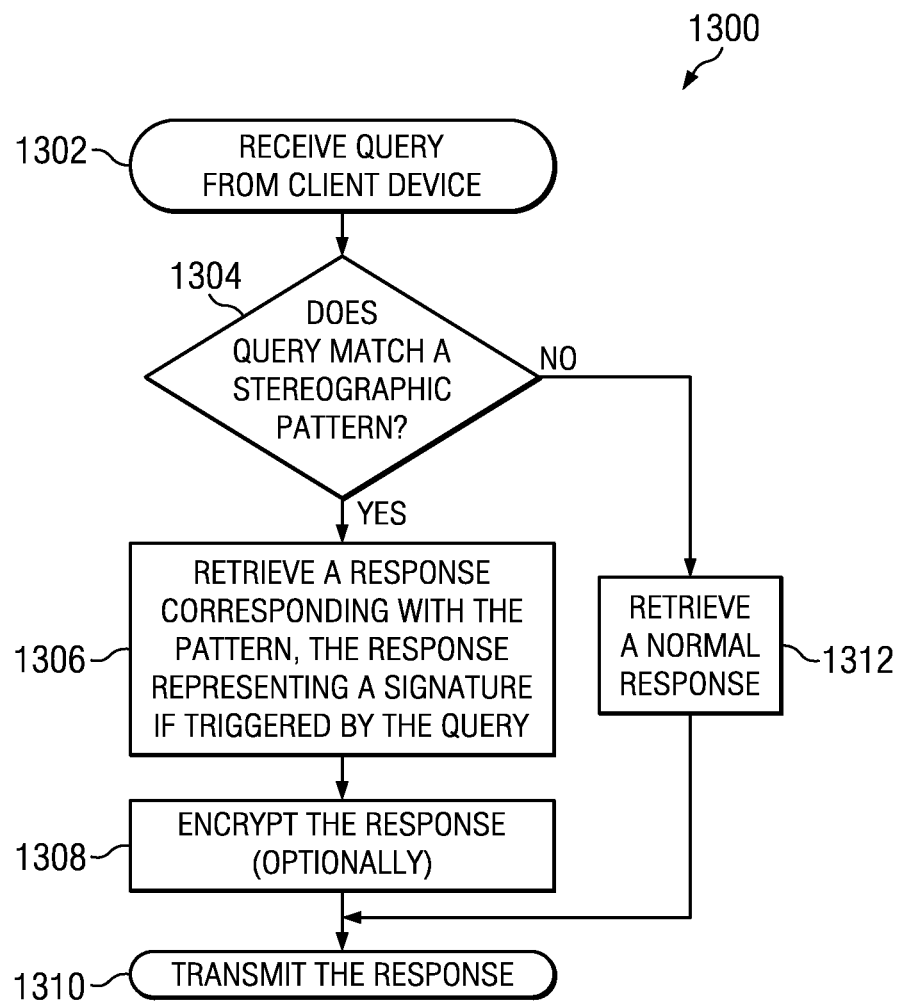
FIG. 13 is a flow diagram that illustrates a method of encoding steganographic signatures in a dialog system.

FIG. 13 is a flow diagram 1300 that illustrates a method of encoding steganographic signatures in a dialog system. The dialog system first receives a query from a client device (1302). Then, the system determines whether the query matches a steganographic pattern (1304). If the query does not match a steganographic pattern, that is, the query does not trigger a signature, the system retrieves a normal response from the dialog system (1312). Then the system transmits the response, that is, the normal response (1310).

On the other hand, if the query does match a steganographic pattern (1304), the system returns a response corresponding with the pattern, where the response represents a signature that is triggered by the query (1306). Optionally, the system can encrypt the response as described herein (1308). Then, the system transmits the response including a representation of the signature (1310).

Embodiments or aspects of the present invention may be implemented in the form of hardware, software, or firmware, or data packets that represent signed models. If implemented in software, the software may be any form of software capable of performing operations consistent with the example embodiments disclosed herein. The software may be stored in any non-transient computer readable medium, such as RAM, ROM, magnetic disk, or optical disk. The embodiments or aspects of the present invention may further be implemented in a remote server or network device accessed by a client device over a network. When loaded and executed by processor(s), the processor(s) are configured to perform operations consistent with the example embodiments disclosed herein. The processor(s) may be any form of processor(s) capable of being configured to execute operations as disclosed herein.

While an example embodiment described in the foregoing description can be implemented with a signed model based on a text dictionary or based on vocabulary grammar of a human language, a signed model including other dictionaries may also be implemented. For example, the dictionary model can be configured to receive input or transmit output of any combination of text, images, audio, or video.

While this invention has been particularly shown and described with references to example embodiments thereof, it will be understood by those skilled in the art that various changes in form and details may be made therein without departing from the scope of the invention encompassed by the appended claims.

What is claimed is:

1. A method of responding to a query at a dialog system, the method comprising:
   by the dialog system, returning a response to the query by an interaction device, the response identifying the dialog system as a signed dialog system in an event the response includes a representation of an embedded steganographic signature, otherwise the response identifying the dialog system as an unsigned dialog system or a dialog system without the embedded steganographic signature.

2. The method of claim 1, further comprising, by the dialog system, returning the response encrypted with a key to enable decrypting the response at the interaction device.

3. The method of claim 2, wherein returning the response includes encrypting the response using the key unique to an entity authorized to employ the dialog system.

4. The method of claim 3, wherein the key is an identifier unique to a distribution of the dialog system.

5. The method of claim 1, further comprising indicating, in the response, an identifier unique to a distribution of the dialog system.

6. The method of claim 1, further comprising first transmitting the response to an intermediary client, and second transmitting the response to an end-user client, the end-user client being the interaction device.

7. The method of claim 1, further comprising transmitting the response as a prompt of the dialog system.

8. A method of providing a query to a dialog system, the method comprising:
   interacting with the dialog system in a manner known to cause a behavioral test response, the behavioral test response representative of a steganographic signature embedded in the dialog system.

9. The method of claim 8, further comprising decrypting the behavioral test response.

10. The method of claim 9, wherein decrypting the behavioral test response includes decrypting the behavioral test response using a key unique to an entity authorized to employ the dialog system.

11. The method of claim 10, wherein the key is unique to a particular distribution of the dialog system.

12. The method of claim 8, further comprising determining a particular distribution of the dialog system based on content of the behavioral test response.

13. The method of claim 8, wherein interacting with the dialog system includes interacting with an intermediary client configured to interact with the dialog system.

14. The method of claim 8, further comprising prompting a user with the behavioral test response, the behavioral test response being a prompt of a dialog system.

15. A method comprising:
building a model for a dialog system with an embedded steganographic signature, a representation of the embedded steganographic signature to be returned from the dialog system responsive to interaction, by an interaction device, corresponding to the embedded signature, the embedded signature distinguishing the dialog system, for a given behavioral test input, from an unsigned dialog system or a signed dialog system without the embedded signature.

16. The method of claim 15, wherein the embedded signature is encrypted with a key to enable decryption of the embedded signature at the interaction device.

17. The method of claim 16, wherein the embedded signature is encrypted with the key unique to an entity authorized to employ the dialog system.

18. The method of claim 16, wherein the key is unique to a distribution of the dialog system.

19. The method of claim 15, wherein the embedded signature indicates an identifier unique to a distribution of the dialog system.

20. The method of claim 15, further comprising representing the embedded signature as a prompt of the dialog system.

* * * * *